United States Patent
Laine et al.

(10) Patent No.: US 10,032,289 B2
(45) Date of Patent: *Jul. 24, 2018

(54) RELATIVE ENCODING FOR A BLOCK-BASED BOUNDING VOLUME HIERARCHY

(71) Applicant: NVIDIA Corporation, Santa Clara, CA (US)

(72) Inventors: Samuli Matias Laine, Vantaa (FI); Timo Oskari Aila, Tuusula (FI); Tero Tapani Karras, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,959

(22) Filed: Dec. 13, 2016

(65) Prior Publication Data

US 2017/0116760 A1    Apr. 27, 2017

Related U.S. Application Data

(63) Continuation of application No. 14/589,910, filed on Jan. 5, 2015, now Pat. No. 9,552,664.

(Continued)

(51) Int. Cl.
*G06T 9/40* (2006.01)
*G06T 15/08* (2011.01)
(Continued)

(52) U.S. Cl.
CPC .............. *G06T 9/40* (2013.01); *G06T 9/001* (2013.01); *G06T 15/08* (2013.01); *G06T 17/005* (2013.01);
(Continued)

(58) Field of Classification Search
CPC ... G06T 15/06; G06T 17/005; G06T 2210/12; G06T 2210/21; G06T 9/40
(Continued)

(56) References Cited

U.S. PATENT DOCUMENTS 6,184,897 B1    2/2001  Gueziec et al.
6,326,963 B1   12/2001  Meehan
(Continued)

OTHER PUBLICATIONS

Mahovsky, J. and Wyvill, B. (2006), Memory-Conserving Bounding Volume Hierarchies with Coherent Raytracing. Computer Graphics Forum, 25: 173-182.*

(Continued)

*Primary Examiner* — Kimberly A Williams
(74) *Attorney, Agent, or Firm* — Zilka-Kotab, PC

(57) ABSTRACT

A system, method, and computer program product for implementing a tree traversal operation for a tree data structure is disclosed. The method includes the steps of receiving at least a portion of a tree data structure that represents a tree having a plurality of nodes and processing, via a tree traversal operation algorithm executed by a processor, one or more nodes of the tree data structure by intersecting the one or more nodes of the tree data structure with a query data structure. A first node of the tree data structure is associated with a first local coordinate system and a second node of the tree data structure is associated with a second local coordinate system, the first node being an ancestor of the second node, and the first local coordinate system and the second local coordinate system are both specified relative to a global coordinate system.

20 Claims, 20 Drawing Sheets

Related U.S. Application Data

(60) Provisional application No. 62/046,093, filed on Sep. 4, 2014.

(51) Int. Cl.
| | |
|---|---|
| *G06T 17/00* | (2006.01) |
| *G06T 9/00* | (2006.01) |
| *G06T 15/00* | (2011.01) |
| *G06T 15/04* | (2011.01) |
| *G06T 15/06* | (2011.01) |
| *G06T 15/80* | (2011.01) |
| *G06T 17/10* | (2006.01) |

(52) U.S. Cl.
CPC ............ *G06T 15/005* (2013.01); *G06T 15/04* (2013.01); *G06T 15/06* (2013.01); *G06T 15/80* (2013.01); *G06T 17/10* (2013.01)

(58) Field of Classification Search
USPC .................................................. 345/419–427
See application file for complete search history.

(56) References Cited

U.S. PATENT DOCUMENTS

| | | | |
|---|---|---|---|
| 6,373,488 | B1 | 4/2002 | Gasper et al. |
| 7,145,562 | B2 | 12/2006 | Schechter et al. |
| 7,337,163 | B1 | 2/2008 | Srinivasan et al. |
| 7,495,664 | B2 | 2/2009 | Keller et al. |
| 7,792,817 | B2 | 9/2010 | Shan et al. |
| 7,930,311 | B2 | 4/2011 | Feng et al. |
| 8,217,935 | B2 | 7/2012 | Purcell et al. |
| 8,452,088 | B1 | 5/2013 | De Ponti et al. |
| 8,502,819 | B1 | 8/2013 | Aila et al. |
| 8,791,945 | B2 | 7/2014 | Clarberg et al. |
| 9,146,957 | B2 | 9/2015 | Wong |
| 9,552,664 | B2 | 1/2017 | Laine et al. |
| 9,582,607 | B2 | 2/2017 | Laine et al. |
| 2007/0024615 | A1 | 2/2007 | Keller et al. |
| 2007/0182732 | A1 | 8/2007 | Woop et al. |
| 2008/0040384 | A1 | 2/2008 | Kuznetsov |
| 2008/0259075 | A1 | 10/2008 | Fowler et al. |
| 2009/0256845 | A1 | 10/2009 | Sevastianov et al. |
| 2010/0192215 | A1 | 7/2010 | Yaxuan et al. |
| 2010/0238169 | A1 | 9/2010 | Fowler et al. |
| 2011/0080403 | A1 | 4/2011 | Ernst et al. |
| 2012/0050289 | A1 | 3/2012 | Park et al. |
| 2012/0268483 | A1 | 10/2012 | Soupikov et al. |
| 2013/0016109 | A1 | 1/2013 | Garanzha |
| 2014/0192904 | A1 | 7/2014 | Rosewarne |
| 2015/0109301 | A1 | 4/2015 | Lee et al. |
| 2015/0138202 | A1 | 5/2015 | Lee et al. |
| 2016/0070767 | A1 | 3/2016 | Karras et al. |
| 2016/0070820 | A1 | 3/2016 | Laine et al. |
| 2016/0071312 | A1 | 3/2016 | Laine et al. |
| 2016/0071313 | A1 | 3/2016 | Laine et al. |
| 2017/0178387 | A1* | 6/2017 | Woop .................... G06T 15/005 |

OTHER PUBLICATIONS

Barringer, R. et al., "Dynamic Stackless Binary Tree Traversal," Journal of Computer Graphics Techniques, vol. 2, No. 1, 2013, pp. 38-49.

Foley, T. et al., "KD-Tree Acceleration Structures for a GPU Raytracer," Graphics Hardware, The Eurographics Association, 2005, pp. 1-8.

Horn et al., "Interactive k-D Tree GPU Raytracing," ACM, Proceedings of the 2007 Symposium on Interactive 3D Graphics and Games, 2007, pp. 1-8.

Kalojanov, J. et al., "Two-Level Grids for Ray Tracing on GPUs," Eurographics, vol. 30, No. 2, 2011, pp. 1-8.

Laine, S., "Restart Trail for Stackless BVH Traversal," High Performance Graphics, The Eurographics Association, 2010, pp. 1-5.

Makinen, E., "A Survey on Binary Tree Codings," The Computer Journal, vol. 34, No. 5, 1991, pp. 438-443.

Parker, S. G. et al., "OptiX: A General Purpose Ray Tracing Engine," ACM Transactions on Graphics, 2010, pp. 1-13.

Wachter, C. et al., "Instant Ray Tracing: The Bounding Interval Hierarchy," Eurographics Symposium on Rendering, The Eurographics Association, 2006, pp. 1-11.

Non-Final Office Action from U.S. Appl. No. 14/589,910, dated Feb. 18, 2016.

Mahovsky, J., "Ray Tracing with Reduced-Precision Bounding Volume Hierarchies," PhD thesis, University of Calgary, 2005, pp. i-vii, 1-4, 66-70, 84-87, 145-148.

Yoon, S.-E., and Manocha, D., "Cache-efficient layouts of bounding volume hierarchies," Computer Graphics Forum (Eurographics) 25, 2006, pp. 507-516.

Kim, Tae-Joon, et al., "RACBVHs: Random-accessible compressed bounding volume hierarchies," Visualization and Computer Graphics, 2010, pp. 1-8.

Non-Final Office Action from U.S. Appl. No. 14/589,904, dated Apr. 7, 2016.

Goldsmith, J. et al., "Automatic Creation of Object Hierarchies for Ray Tracing," IEEE CG&A, May 1987, pp. 14-20.

MacDonald, J. D. et al., "Heuristics for ray tracing using space subdivision," The Visual Computer, vol. 6, 1990, pp. 153-166.

Notice of Allowance from U.S. Appl. No. 14/589,910, dated Sep. 13, 2016.

Notice of Allowance from U.S. Appl. No. 14/589,904, dated Oct. 17, 2016.

Non-Final Office Action from U.S. Appl. No. 14/563,872, dated Oct. 11, 2017.

Non-Final Office Action from U.S. Appl. No. 14/697,480, dated Sep. 25, 2017.

Final Office Action from U.S. Appl. No. 14/563,872, dated May 11, 2018.

\* cited by examiner

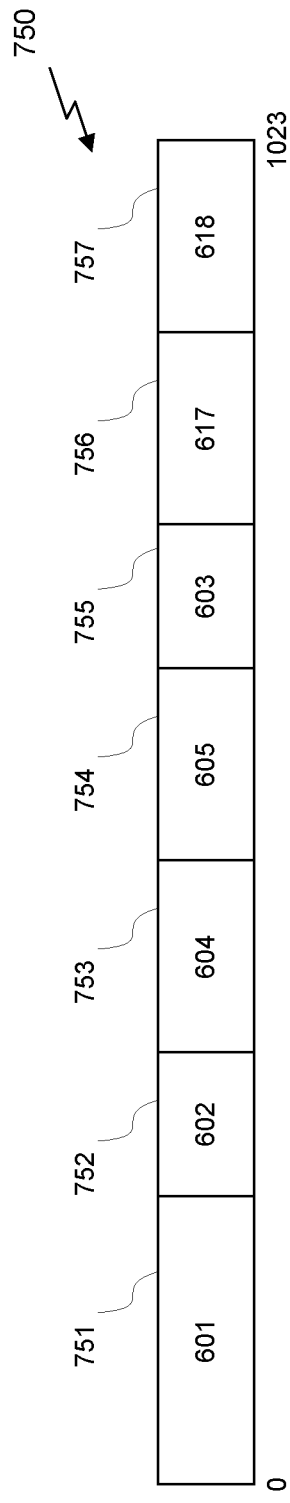
*Fig. 7B*
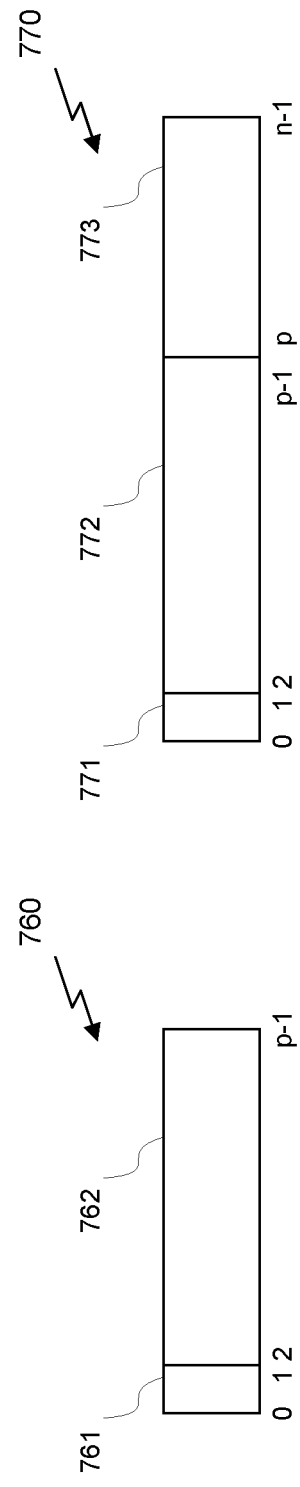
*Fig. 7C*
*Fig. 7D*

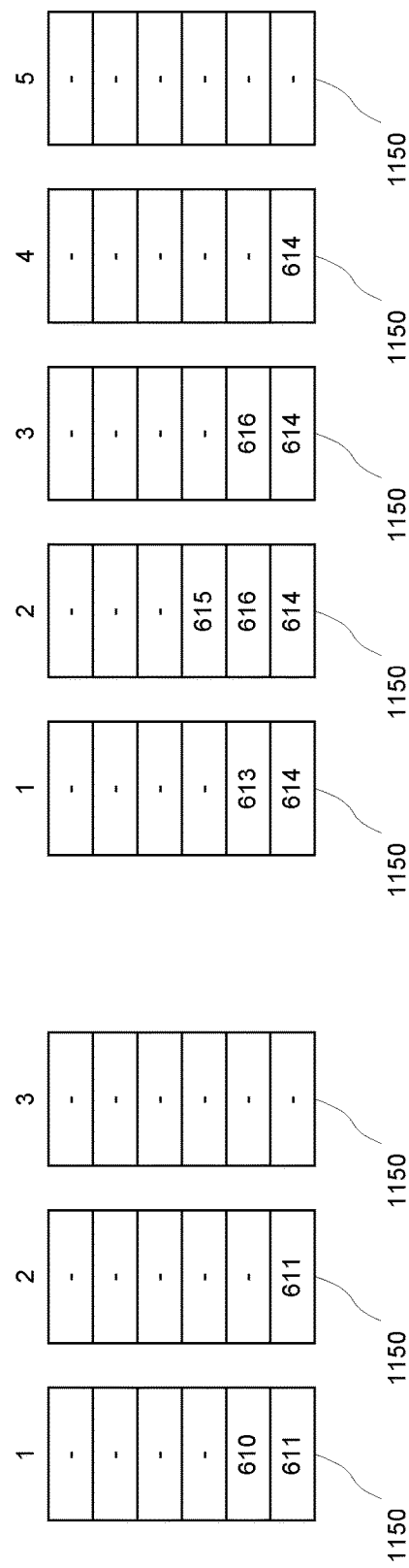
*Fig. 11D*
*Fig. 11E*
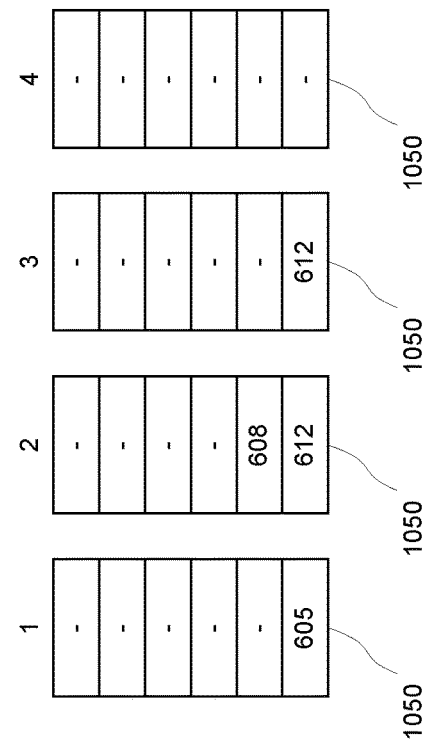
*Fig. 11F*

RELATIVE ENCODING FOR A BLOCK-BASED BOUNDING VOLUME HIERARCHY

CLAIM OF PRIORITY

This application is a continuation of U.S. application Ser. No. 14/589,910, filed Jan. 5, 2015, the entire contents of which is incorporated herein by reference.

FIELD OF THE INVENTION

The present invention relates to data structure representations, and more particularly to block-based bounding volume hierarchy data structures for representing a three-dimensional scene.

BACKGROUND

Computer graphics uses a variety of methods to generate two-dimensional representations of a three-dimensional scene. For example, a three-dimensional scene represented as a plurality of geometric primitives (e.g., points, lines, triangles, quads, meshes, etc.) may be rasterized to project the geometric primitives to a projection plane and then shaded to calculate a color for one or more pixels of the projection plane based on the rasterization. Alternatively, another technique for generating two-dimensional representations of the three-dimensional scenes is to perform ray-tracing. As is known in the art, ray-tracing is a technique that includes the operation of sending out rays from a particular viewpoint and intersecting the rays with the geometry of the scene. When an intersection is detected, lighting and shading operations may be performed to generate a color value for a pixel of the projection plane intersected by the ray. Additionally, other rays may be generated based on the intersected primitives that contribute to the color of the intersected pixel or other pixels.

Because the number of geometric primitives in a scene may be quite large (e.g., on the order of millions of triangles, etc.) and the number of rays generated to test for intersection against those primitives is also large (e.g., on the order of millions or even billions of rays, etc.), a data structure may be generated to increase the efficiency of performing the intersection tests. One such data structure is a tree, such as a k-d (k-dimensional) tree or a bounding volume hierarchy. When an intersection test is performed for a given ray, a tree traversal may be performed in order to efficiently test the ray against all of the primitives included in the scene. Typically, a tree is traversed by pushing a root node to a traversal stack. The top element in the traversal stack is popped from the stack and the children of the node popped from the stack are tested for intersection with the ray. Any intersected child nodes are then pushed onto the stack and the process is repeated until the stack is empty.

One characteristic of this approach is that the tree traversal may return to a certain part of the tree multiple times. In massively parallel architectures, this can degrade performance because the memory for the same part of the tree may be fetched multiple times. This leads to unnecessary delays in performing the tree traversal. Furthermore, the memory consumption of the tree data structure may be uncomfortably high, and compression of the data may be desirable. Thus, there is a need for addressing these issues and/or other issues associated with the prior art.

SUMMARY

A system, method, and computer program product for implementing a tree traversal operation for a tree data structure is disclosed. The method includes the steps of receiving at least a portion of a tree data structure that represents a tree having a plurality of nodes and processing, via a tree traversal operation algorithm executed by a processor, one or more nodes of the tree data structure by intersecting the one or more nodes of the tree data structure with a query data structure. A first node of the tree data structure is associated with a first local coordinate system and a second node of the tree data structure is associated with a second local coordinate system, the first node being an ancestor of the second node, and the first local coordinate system and the second local coordinate system are both specified relative to a global coordinate system.

BRIEF DESCRIPTION OF THE DRAWINGS

FIG. 7B illustrates the structure of a compression block data structure, in accordance with one embodiment;

FIG. 7C illustrates a data structure for encoding a node in a field of the compression block data structure using two sub-fields, in accordance with one embodiment;

FIG. 7D illustrates a data structure for encoding a node in a field of the compression block data structure using three sub-fields, in accordance with one embodiment;

FIGS. 11B-11E illustrate the state of a local stack data structure after each iteration of the inner loop of the depth-first, compression block aware tree traversal operation, in accordance with one embodiment;

FIG. 11F illustrates the state of the traversal stack data structure after each iteration of the outer loop during the depth-first, compression block aware tree traversal operation, in accordance with one embodiment.

DETAILED DESCRIPTION

Figure 1A:
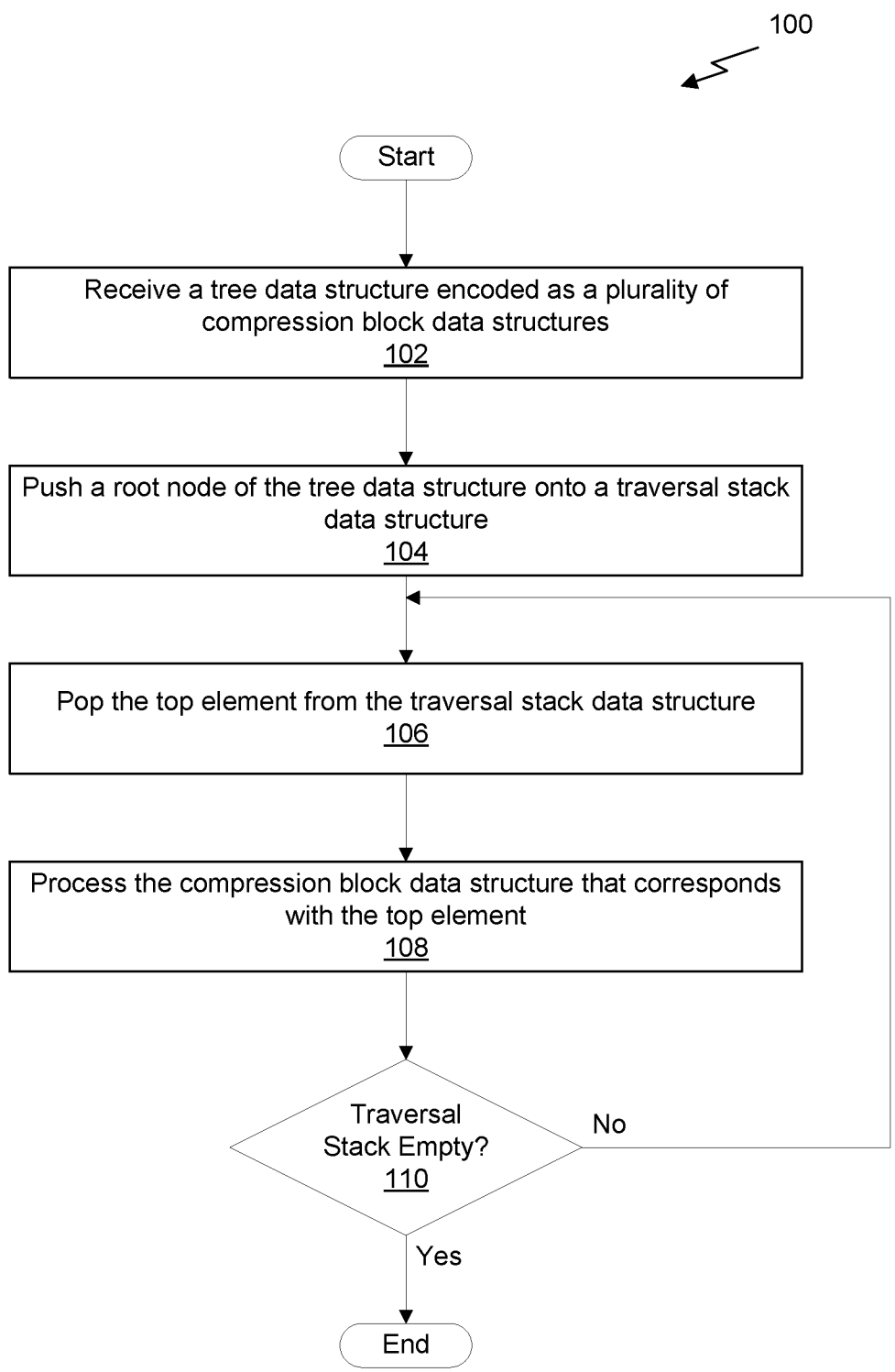
FIG. 1A illustrates a flowchart of a method for performing a tree traversal operation, in accordance with one embodiment.

FIG. 1A illustrates a flowchart of a method 100 for performing a tree traversal operation, in accordance with one embodiment. At step 102, at least a portion of a tree data structure is received that represents a tree having a plurality of nodes. In one embodiment, the tree data structure is encoded as a plurality of compression block data structures. The tree data structure may represent a data set such as a plurality of geometric primitives included in a 3D model. The tree may comprise a plurality of nodes arranged in a hierarchy including internal nodes associated with one or more child nodes and leaf nodes associated with a subset of data within the data set. Each compression block data structure may encode a subset of nodes within the tree hierarchy and each compression block data structure may be hierarchically linked to one or more other compression block data structures. The hierarchical links may be encoded in a particular compression block data structure as pointers to other compression block data structures.

At step 104, a root node of the tree data structure is pushed onto a traversal stack data structure. The traversal stack data structure may be associated with an outer loop of a tree traversal operation algorithm that is configured to process one or more of the compression block data structures. The tree traversal operation algorithm may be configured to be executed by a processor. The tree traversal operation algorithm is executed by a tree traversal unit in a parallel processing unit such as a graphics processing unit (GPU). The tree traversal operation may be implemented in hardware (e.g., by a static integrated circuit, etc.), software (e.g., one or more instructions implemented by a programmable core or cores, etc.), or a combination of hardware and software. For example, the tree traversal unit may implement various logic that is configured to execute a loop for processing nodes during execution of the tree traversal operation, or the tree traversal unit may include one or more special processing units configured to execute an instruction set, where a plurality of instructions may be executed by the tree traversal unit to implement the tree traversal operation.

At step 106, the processor pops a top element from the traversal stack data structure. The top element corresponds to a root node for a particular compression block data structure in the tree data structure. At step 108, the processor processes a compression block data structure that corresponds with the top element. In one embodiment, the top element is pushed onto a local stack data structure associated with an inner loop of the tree traversal operation algorithm. Processing the corresponding compression block data structure, via iteration of an inner loop, may be performed for a number of nodes by: (1) popping the top element from the local stack data structure; (2) testing the popped element for intersection with a query data structure; and (3) if the element intersects the query data structure, then determining a type of the element. If the element is a leaf node, then the data associated with the leaf node may be stored in a queue to be processed further. In one embodiment, the further processing happens after the tree traversal operation is complete. In another embodiment, the further processing happens during the tree traversal operation (e.g., between iterations of the outer loop). If the element is a transition node (i.e., a node included in a first compression block data structure that is associated with a pointer to a second compression block data structure), then a pointer associated with the node is added to a list data structure to be pushed onto the traversal stack data structure after the inner loop has finished processing all of the nodes of the compression block data structure. Finally, if the element is an internal node of the compression block data structure, then the child nodes of the element are pushed onto the local stack data structure.

After the intersected nodes included in the compression block data structure have been processed by the inner loop and the local stack data structure is empty, then, at step 110, the traversal stack data structure is checked. If the traversal stack data structure is not empty, then the method 100 returns to step 106 where the next element is popped from the traversal stack data structure during another iteration of the outer loop. However, if the traversal stack data structure is empty, then the method 100 terminates and the tree traversal operation is complete.

In one embodiment, each node in the tree data structure is associated with a bounding volume. The bounding volume may comprise an axis-aligned bounding box, a sphere, a bounding rectangle, or any other bounding volume well-known in the art. A representation of a node in the tree data structure may include one or more high-precision values that specify the bounding volume relative to a global coordinate system. In one embodiment, the representation of a node includes six high-precision values that specify six planes of an axis-aligned bounding box. In another embodiment, the representation of the node may be relative to one or more other nodes. For example, a representation of a node within a compression block data structure may include one or more low-precision values that specify planes of the axis-aligned bounding box for the node relative to a local coordinate system of a root node of the compression block data structure that is specified using three high-precision values that indicate a location of an origin of the local coordinate system relative to the global coordinate system and three low-precision values that indicate a scale of the local coordinate system. In one embodiment, a high-precision value, as used herein, may refer to 32-bit floating point values, and a low-precision value, as used herein, may refer to an 8-bit integer.

Figure 1B:
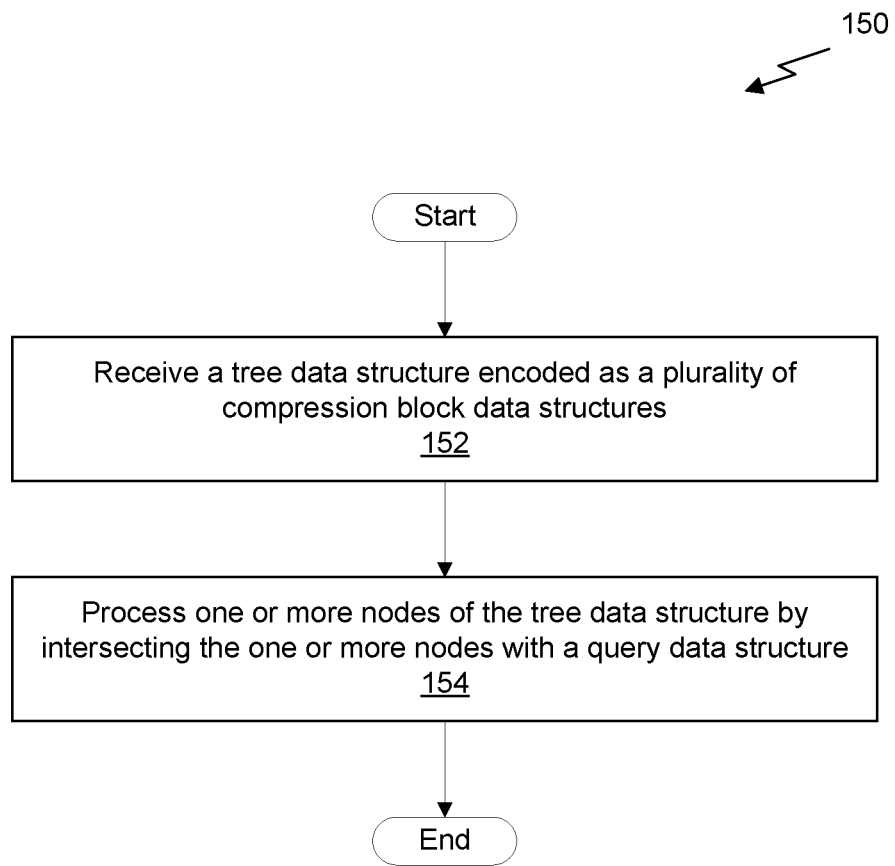
FIG. 1B illustrates a flowchart of a method for performing a tree traversal operation, in accordance with another embodiment.

FIG. 1B illustrates a flowchart of a method 150 for performing a tree traversal operation, in accordance with another embodiment. At step 152, at least a portion of a tree data structure is received that represents a tree having a plurality of nodes. The tree may be a bounding volume hierarchy associated with a plurality of geometric primitives of a three-dimensional model. At step 154, a processor processes one or more nodes of the tree data structure by intersecting the one or more nodes with a query data structure. In one embodiment, the query data structure comprises a ray data structure that represents a ray to be intersected with the bounding volume hierarchy. The intersection tests may be configured to be executed by a processor, such as a tree traversal unit in a parallel processing unit. The intersection tests, and any other functionality associated with processing the one or more nodes, may be implemented in hardware (e.g., by a static integrated circuit, etc.), software (e.g., one or more instructions implemented by a programmable core or cores, etc.), or a combination of hardware and software.

In one embodiment, a first node of the tree data structure is associated with a first local coordinate system. The first local coordinate system may be specified relative to a global coordinate system. The first node may be an ancestor of a second node of the tree data structure that is associated with a second local coordinate system. The second local coordinate system may be specified relative to the global coordinate system. As used herein, an ancestor node refers to a node that is higher in the hierarchy of the tree data structure than another node, the other node included in a sub-tree of one of the child nodes of the ancestor node.

In one embodiment, each local coordinate system may be encoded within the tree data structure using three high-precision values to specify an origin of the local coordinate system relative to an origin of the global coordinate system. The three high-precision values may represent a translation relative to each of the three axes of the global coordinate system. Each local coordinate system may also be encoded within the tree data structure using three low-precision values to specify a scale factor associated with each axis of the local coordinate system. The scale factor may be used to adjust the spatial resolution of the values encoded relative to the local coordinate system, when the values are encoded using a fixed number of bits.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
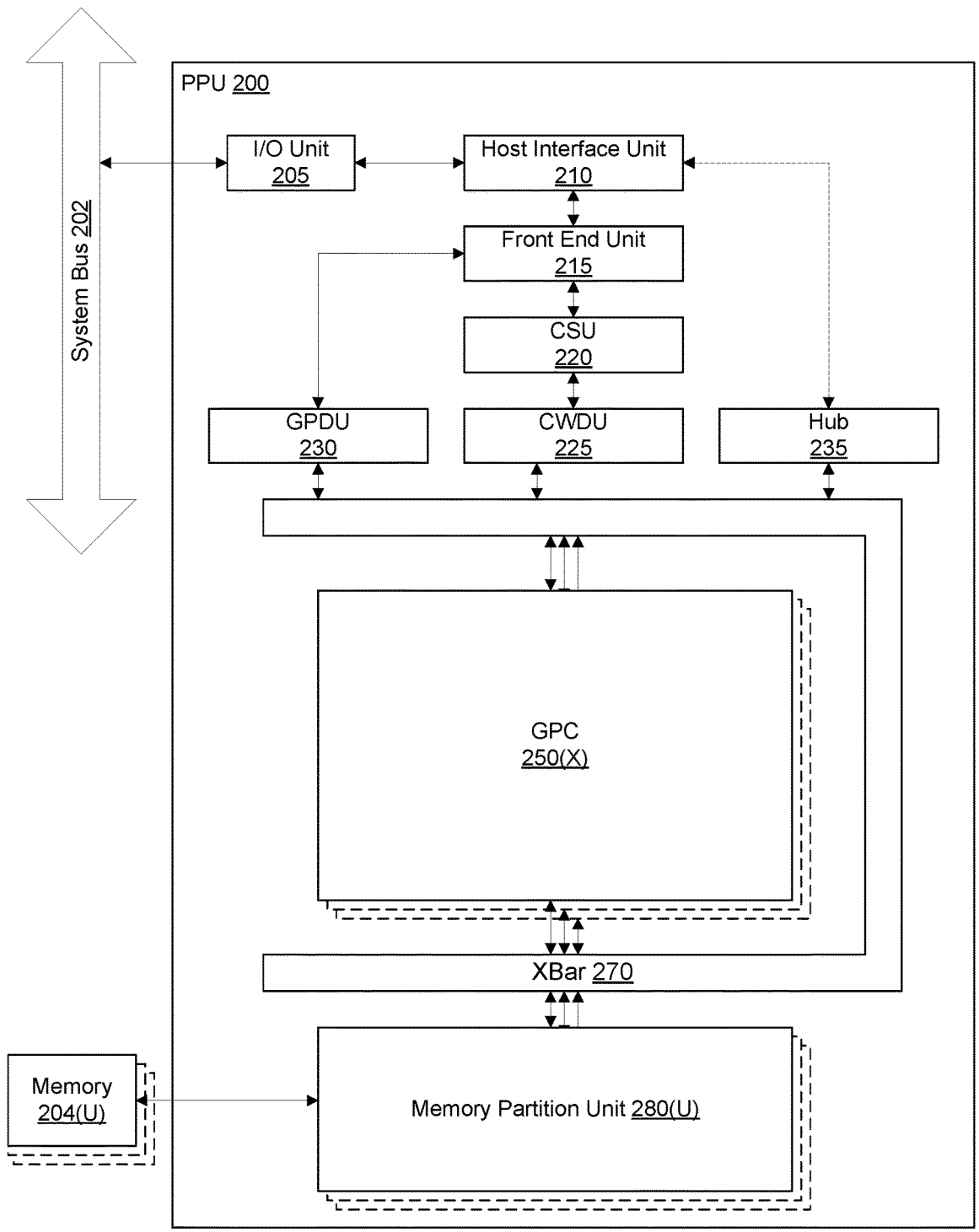
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same thread block may exchange data through shared memory. In one embodiment, a warp comprises 32 related threads.

Figure 3A:
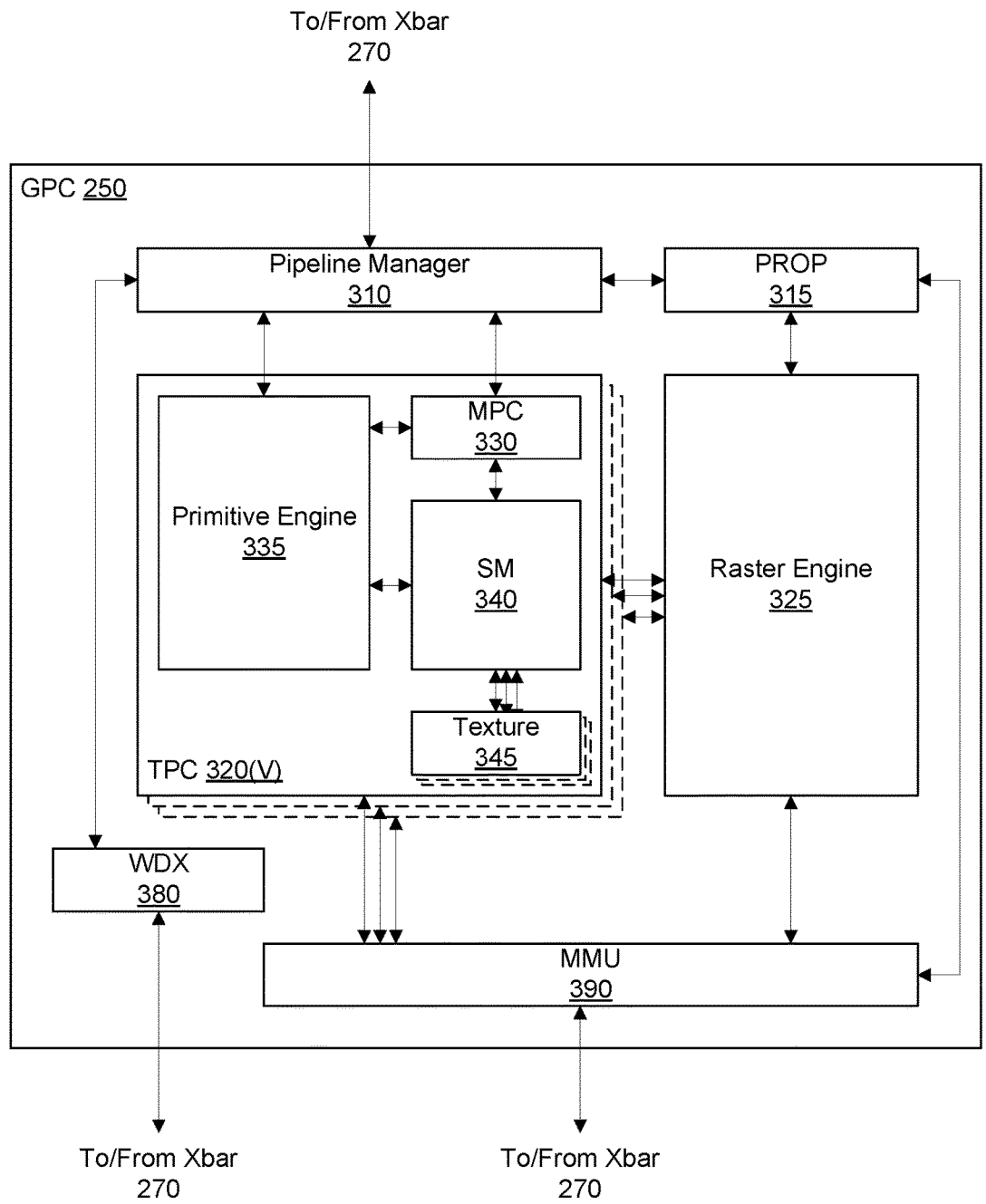
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. Primitives lying outside a viewing frustrum may be clipped by the clipping engine. The setup engine receives transformed vertices that lie within the viewing plane and generates edge equations associated with the geometric primitive defined by the vertices. The edge equations are transmitted to the coarse raster engine to determine the set of pixel tiles covered by the primitive. The output of the coarse raster engine may be transmitted to the culling engine where tiles associated with the primitive that fail a hierarchical z-test are culled. Those fragments that survive culling may be passed to a fine raster engine to generate coverage information (e.g., a coverage mask for each tile) based on the edge equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
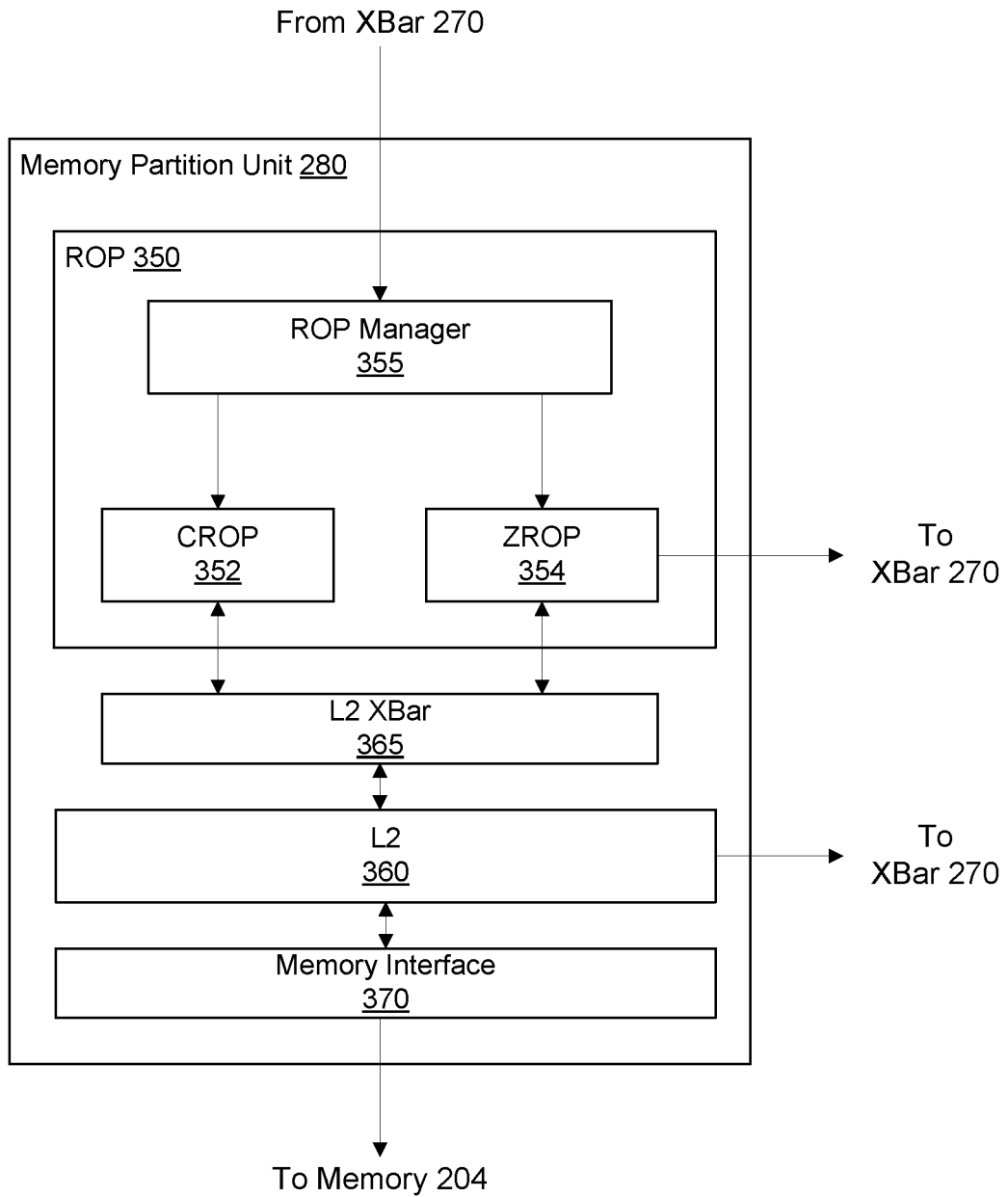
FIG. 3B illustrates a memory partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
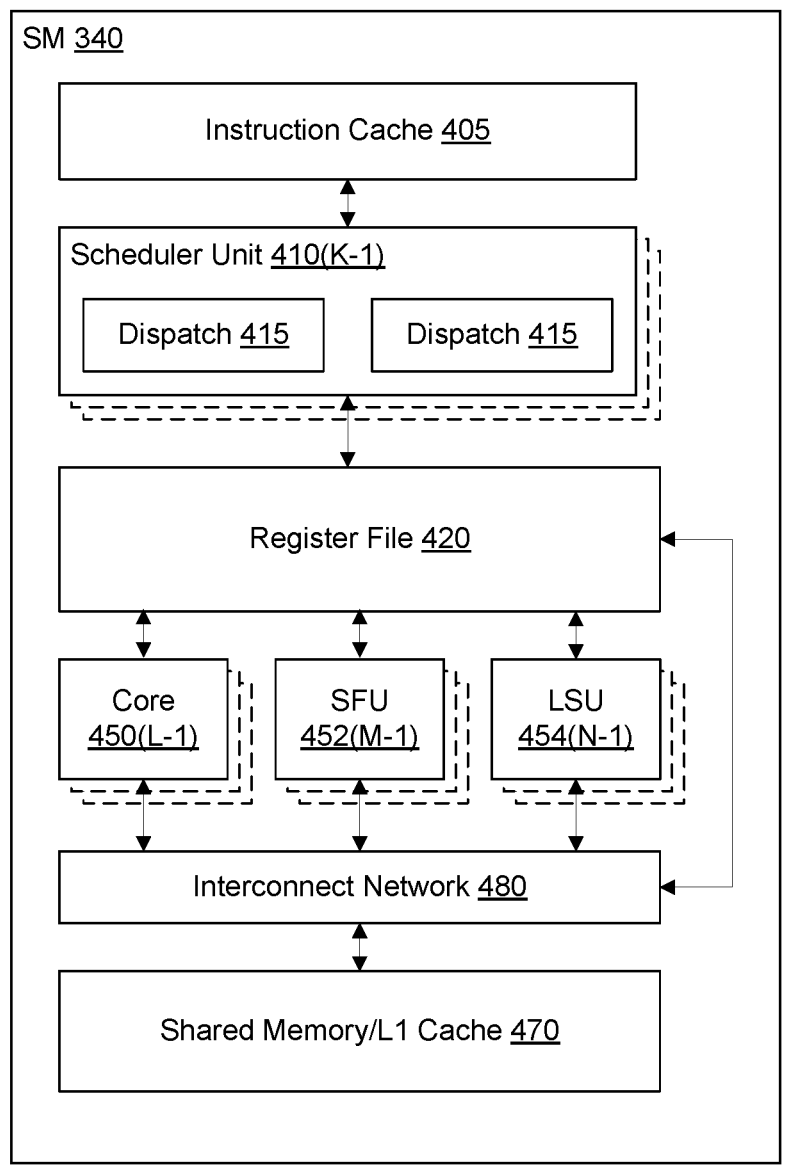
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between subsets of the functional units such that each subset is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., transcendental function evaluation, attribute interpolation, and the like), N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be executed on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Tree Traversal Unit

Figure 5A:
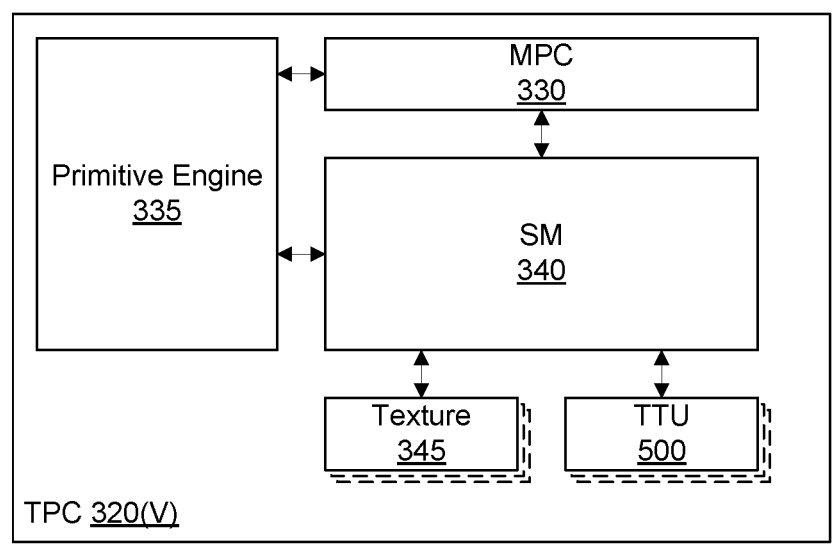
FIG. 5A illustrates a texture processing cluster of FIG. 3A, modified to include one or more tree traversal units, in accordance with one embodiment.

FIG. 5A illustrates a TPC 320 of FIG. 3A, modified to include one or more tree traversal units (TTUs) 500, in accordance with one embodiment. The TTUs 500 are each configured to perform tree traversal operations. Tree traversal operations are commonly utilized in, for example, ray tracing algorithms in computer graphics. However, the TTUs 500 are optimized for general tree traversal operations and are not limited, specifically, to ray tracing techniques.

In one embodiment, each TPC 320 included in the PPU 200 may include one or more TTUs 500 for performing tree traversal operations. The TTUs 500 are coupled to the SM 340 similar to the texture units 345. It will be appreciated, that in alternate embodiments, the TTUs 500 may be included in the SM 340 similar to the cores 450 or the SFUs 452. Alternately, one or more TTUs 500 may be implemented within the PPU 200 and shared by one or more GPCs 250 or one or more SMs 340.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersecting a query shape with the tree. The query shapes may be, e.g., rays, bounding boxes, frustums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

For example, one type of tree traversal operation for which the TTU 500 may be optimized is to intersect a ray with a BVH data structure that represents each of the geometric primitives in a 3D scene or 3D model. The TTU 500 may be particularly useful in ray-tracing applications in which millions or even billions of rays are intersected with the geometric primitives of a 3D model represented by a BVH data structure.

Figure 5B:
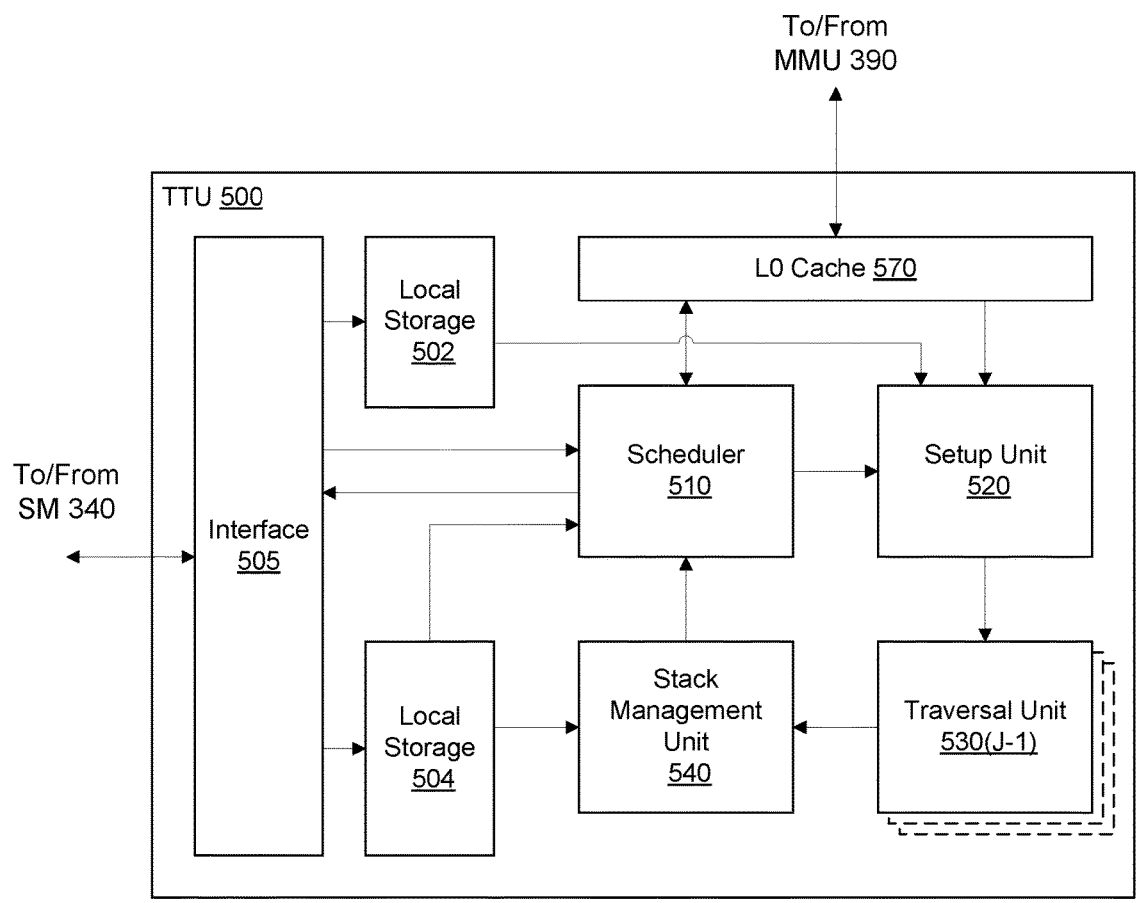
FIG. 5B illustrates the TTU 500 of FIG. 5A, in accordance with one embodiment.

FIG. 5B illustrates the TTU 500 of FIG. 5A, in accordance with one embodiment. As shown in FIG. 5B, the TTU 500 includes an interface 505, a scheduler unit 510, a setup unit 520, one or more traversal units 530, and a stack management unit 540. The TTU 500 also includes a level-zero (L0) cache unit 570 coupled to a memory architecture hierarchy including one or more L2 caches 360 and memory units 204 via the MMU 390. The TTU 500 also includes local storage 502 for a plurality of query data structures and local storage 504 for a plurality of stack data structures. The local storage 502 and the local storage 504 may be, e.g., static RAM, a latch array, a register file, or the like. It will be appreciated that the TTU 500 may include other hardware units in addition to or in lieu of the hardware units shown in FIG. 5B.

The interface 505 may receive instructions and/or data for performing tree traversal operations from the SM 340. In one embodiment, the SM 340 may transmit the instructions and/or data directly to the interface 505 via a plurality of dedicated interconnects (e.g., wires, paths in a metal layer of a semiconductor, etc.). In another embodiment, the SM 340 may write the instructions to one or more special registers associated with the TTU 500, and the interface 505 may monitor the registers for any updates from the SM 340.

The instructions may include instructions for configuring the TTU 500 to perform a tree traversal operation. The instructions may include operands such as pointers that direct the TTU 500 to a tree data structure and/or a query data structure are located in the memory 204. The interface 505 may cause, at least a portion of, the tree data structure and/or the query data structure to be fetched into the L0 cache unit 570 or the local storage 502.

The L0 cache unit 570 is coupled to the MMU 390 and provides a low-level, local access to the memory architecture hierarchy of the PPU 200. In one embodiment, the L0 cache unit 570 includes a number of entries, where each entry is sized according to a size of a cache line in the memory architecture hierarchy. For example, the L2 cache 360 associated with the memory 204 may implement a cache line having L bytes of information, and the L0 cache unit 570 may include M entries of L bytes to enable up to M cache lines to be stored in the L0 cache unit 570. In one embodiment, the L0 cache unit 570 may include eight entries for cache lines having 128 bytes of data. Of course, the size and number of entries in the L0 cache unit 570 may vary widely between different architectures and other cache line sizes and number of entries are contemplated as being within the scope of various embodiments. Furthermore, the L0 cache unit 570 may include logic in addition to the raw data storage for fetching cache lines from the memory 204 and/or the other hierarchical cache units. For example, the logic may include hardware configured to select particular entries in the L0 cache unit 570 to evict in order to enable other data to be fetched into the L0 cache unit 570. The logic may also include hardware for maintaining cache coherency. For example, the logic may determine when write-back operations need to be performed for dirty cache lines.

In one embodiment, the query data structure associated with a particular tree traversal operation is stored in the local storage 502. The query data structure may specify a query shape to be intersected with a tree data structure. The interface 505 may receive the data for the query data structure and store the data in an available memory location in the local storage 502. The interface 505 may also initialize a stack data structure associated with the query data structure in the local storage 504. The stack data structure may include a portion of memory for creating a stack associated with the particular tree traversal operation. In one embodiment, the stack data structure is initialized by allocating a portion of the local storage 504 to a particular tree traversal operation and pushing a root node for a tree data structure onto the stack data structure. It will be appreciated that pushing a root node onto the stack data structure may be performed by storing a pointer to a data structure for the root node of the tree data structure in a memory location associated with the stack data structure.

The interface 505 may notify the scheduler 510 of an event when the interface 505 receives an instruction that causes a tree traversal operation to be launched by the TTU 500. The event may indicate that the TTU 500 has been tasked with performing a tree traversal operation for a particular tree data structure and a particular query data structure. The scheduler 510 may receive notice of the event via a signal. The signal may be a token that is passed to the scheduler 510 via a data communication channel. The token may include an identifier associated with a particular query data structure stored in the local storage 502.

The scheduler 510 may include a queue (e.g., first-in, first-out or FIFO, etc.) that includes a number of slots that store identifiers for query data structures associated with tree traversal operations. Identifiers may be unique within the scope of the TTU 500. In other words, each identifier uniquely identifies a particular query data structure stored in the local storage 502. In one embodiment, identifiers are allocated to query data structures dynamically when the query data structures are stored in the local storage 502. The queue may be used such that a number of different tree traversal operations may be in-flight in the TTU 500 at any given time, and the queue may be implemented, at least in part, to hide the latency associated with memory operations for fetching node data from the memory 204 into the L0 cache unit 570. In one embodiment, the queue includes, e.g., 32 slots for storing a number of identifiers for query data structures to be intersected with the tree data structure. The total number of slots may be increased or decreased based on the latency associated with memory operations, which may be dependent, at least in part, on the details of the memory architecture hierarchy.

The scheduler 510 may also maintain status entries for tracking the status of the tree traversal operations associated with each of the query data structures referenced by identifiers stored in the queue. The status entries may indicate, for example, a scheduling priority for a particular tree traversal operation, whether data associated with the next node to be tested in the tree traversal operation is currently stored in the L0 cache unit 570, whether the tree traversal operation associated with a particular query data structure is currently being processed by the one or more traversal units 530, or whether results for a particular tree traversal operation are available in the memory 204. The scheduler 510 may also notify the SM 340, via the interface 505, of certain events, such as notifying the SM 340 that the data for a particular tree traversal operation is available in the memory 204 or in the register file 420 of the SM 340, or notifying the SM 340 that the queue in the scheduler 510 is full.

Once the scheduler 510 has received an event notification from the interface 505 indicating that the tree traversal operation should be launched, the scheduler 510 may begin to manage the execution of the tree traversal operation. In one embodiment, the scheduler 510 may pop the top element from the stack data structure in the local storage 504 associated with the tree traversal operation. The top element may include a pointer to a location of a node of the tree data structure in the memory 204. The scheduler 510 may issue one or more fetch commands to the L0 cache unit 570 to fetch data associated with the node into the L0 cache unit 570. The fetch commands may include an address of the data to be fetched. For example, the address may point to a root node for a block of the tree data structure. The L0 cache unit 570 will determine if the requested data is in the L0 cache unit 570. If the data is not currently stored in the L0 cache unit 570, then the fetch request results in a cache miss and the data will be fetched from the memory architecture hierarchy, such as L2 cache unit 360 or memory 204, as required. Once the data has been returned from the memory architecture hierarchy, the L0 cache unit 570 will inform the scheduler 510 that the data is available. If the data is currently stored in the L0 cache unit 570, then the fetch request results in a cache hit and the L0 cache unit 570 will inform the scheduler 510 that the data is immediately available. It will be appreciated that the data associated with a particular node may be included in data associated with a plurality of nodes of the tree data structure that are stored in contiguous memory and comprise a single cache line. Therefore, each fetch request may result in data for more than one node being loaded into the L0 cache unit 570.

Once the data has been fetched into the L0 cache unit 570, the scheduler 510 transmits a request to the setup unit 520 to initiate the tree traversal operation for one or more nodes of the tree data structure. The setup unit 520 may perform any number of operations for configuring the one or more traversal units 530 to perform the tree traversal operation. For example, in one embodiment, the setup unit 520 may fetch the data associated with the query data structure and the data associated with one or more nodes of the tree data structure from the local storage 502 and the L0 cache unit 570, respectively. In another embodiment, the setup unit 520 may transform coordinates associated with the query data structure from a global coordinate system into a local coordinate system. In another embodiment, the setup unit 520 may configure one or more traversal units 530 to execute instructions for performing the tree traversal operation for one or more nodes of the tree data structure.

In one embodiment, the TTU 500 is configured to perform tree traversal operations on blocks of a tree data structure. As used herein, a block may include one or more nodes of the tree data structure that fit within a particular cache line. The block may include a block root node having zero or more child nodes that are also included in the block. Each of the zero or more child nodes may also include corresponding child nodes, those corresponding child nodes may include one or more additional child nodes, and so forth. Some or all of the corresponding child nodes and/or the additional child nodes may also be included in the block. A block may be defined as no larger than a cache line (e.g., 128 bytes, etc.) and may contain a fixed or variable number of nodes. It will be appreciated that the tree data structure may include a plurality of blocks that together represent all of the nodes in the tree data structure.

The one or more traversal units 530 may receive data for a particular query data structure to intersect with one or more nodes of the tree data structure. Each traversal unit 530 may be configured to test each of the child nodes of a particular node for intersection with the query data structure. If the query data structure intersects the child node, and the child node is included in the same block of the tree data structure as the parent node, then the child node is added to a local stack data structure maintained by the traversal unit 530. Once all of the child nodes of the particular node have been tested, then the traversal unit 530 may be configured to check the local stack data structure. If the local stack data structure is empty, then no nodes need to be tested for intersection with the query data structure, and the traversal unit 530 may notify the stack management unit 540 that the tree traversal operation has been completed, at least for the nodes in that particular block of the tree data structure. However, if the local stack data structure is not empty, then the traversal unit 530 pops the top element from the local stack data structure and repeats the process for this new node.

If a particular node being tested by the traversal unit 530 is a leaf node and is intersected by the query data structure, then the elements associated with the leaf node may be added to a result queue. In one embodiment, the result queue may be maintained in conjunction with the local storage 504 associated with the query data structure in question. If the particular node being tested by the traversal unit 530 is an internal node that is included in another block of the tree data structure, then the node included in the other block may be added to a result queue.

In one embodiment, the traversal units 530 may implement a pipelined architecture in order to hide latency associated with a particular operation performed for each node. For example, a pipelined architecture may be implemented for an intersection test that takes a number of cycles to complete such that a number of intersection tests for different nodes and different query data structures may be in flight at any given time within a traversal unit 530. In other words, each traversal unit 530 may be performing tree traversal operations for a number of different nodes and a number of different query data structures substantially simultaneously.

In one embodiment, each traversal unit 530 includes a local storage for storing a number of different blocks of the tree data structure. The local storage may be a temporary location comprising static RAM for storing one or more cache lines included in the L0 cache unit 570 and needed for performing a tree traversal operation for a particular query data structure. For example, the local storage may include 5 slots of 128 bytes for storing up to five cache lines from the L0 cache unit 570 that include data for up to five different blocks of the tree data structure (or different tree data structures). The data in up to four of the slots in the local storage may be accessed by the logic of the traversal unit 530 during any given clock cycle, and data for the remaining slot may be written to the local storage by the setup unit 520 during the clock cycle. Each traversal unit 530 may also include local storage for storing a number of query data structures. The number of query data structures stored locally in the traversal unit 530 may be equal to the number of available slots for storing blocks of the tree data structure. Similarly, each traversal unit 530 may include local storage for storing a number of local stack data structures used for traversing the different blocks of the tree data structure.

The stack management unit 540 receives the results of a tree traversal operation from the result queue. The result queue may include leaf data such as a geometric primitive to be tested for intersection with a query shape as well as nodes (or rather pointers to nodes) included in other blocks of the tree data structure. In one embodiment, the stack management unit 540 transmits leaf data such as the geometric primitives to the SM 340. As described herein, the leaf data may represent those elements stored in the tree data structure that are potentially intersected by the query data structure. The SM 340 may be configured to process the results of the tree traversal operation by any means necessary. For example, if the results of the tree traversal operation include a set of geometric primitives, the SM 340 may be configured to test those particular geometric primitives for intersection with the query data structure. It will be appreciated that testing a geometric primitive included in a leaf node, such as a triangle or quad, for intersection with the query data structure is a different type of operation than testing a leaf node, associated with a bounding volume, for intersection with the query data structure. The SM 340 may also be configured to launch one or more additional tree traversal operations for new query data structures based on the processing of the geometric primitives included in the results.

The stack management unit 540 may also manage traversal stacks for each of the tree traversal operations currently being executed by the TTU 500. A traversal stack may refer to a data structure that temporarily stores particular nodes in the tree data structure that need to be tested against the query data structure during future iterations of the processing loop. A non-empty traversal stack that includes one or more nodes of the tree data structure indicates that at least a portion of the tree traversal operation still needs to be scheduled for execution by the one or more traversal units 530.

When the stack management unit 540 receives a pointer to a node for a new block of the tree data structure in the result queue, the stack management unit 540 adds the node to the traversal stack for a particular tree traversal operation. The stack management unit 540 may be notified once the one or more traversal units 530 have completed testing the nodes of a given block of the tree data structure. In one embodiment, the one or more traversal units 530 may notify the stack management unit 540 of an event by including a signal and/or data in the result queue that indicates the one or more traversal units 530 have completed executing the tree traversal operation for a block of the tree data structure. Once the stack management unit 540 receives the event, the stack management unit 540 may cause the scheduler 510 to initiate the next portion of the tree traversal operation for a different block associated with a node included in the traversal stack. In other words, the scheduler unit 510 may retrieve the top element (i.e., a new node) from the traversal stack included in the local storage 504, fetch any data required for performing the tree traversal operation for the new node into the L0 cache unit 570 and/or local storage 502, and notify the setup unit 520 to configure the one or more traversal units 530 to perform the tree traversal operation for one or more nodes in the new block of the tree data structure.

Although the TTU 500 described above has been described relative to a tree traversal operation for a general query data structure as applied to a general tree data structure, the TTU 500, in some embodiments, may be configured to perform a tree traversal operation for a specific application, such as ray-tracing. In other words, a tree traversal operation may be limited to intersecting a ray with a tree that represents a plurality of geometric primitives. The tree may be implemented as a bounding volume hierarchy (BVH), spatial subdivision tree, and the like. The operation of the TTU 500 as applied to a ray-tracing application in association with a BVH will be described in more detail below.

In order to intersect a ray with the BVH, the SM 340 may transmit an instruction to the interface 505 of the TTU 500. In response to the instruction, the interface 505 may load a ray data structure into the local storage 502 and initialize a traversal stack data structure in the local storage 504. The interface 505 may also push a root node for the BVH onto the traversal stack data structure. The interface 505 may also assign a ray identifier to the ray data structure in the local storage 502 for identifying the particular ray data structure associated with a particular tree traversal operation. In a typical ray-tracing algorithm utilized to create a computer generated image, hundreds, thousands, or even millions of rays may be cast and intersected with the tree data structure. Thus, the ray identifier provides a useful way for tracking and identifying a tree traversal operation in flight in the TTU 500 for a particular ray.

The ray data structure may be stored in the local storage 502 such that the ray data structure may be quickly accessed during the tree traversal operation associated with the ray. A ray may be defined, e.g., by a set of tuples specifying a starting coordinate and an ending coordinate, or, alternately, a starting coordinate, a direction, and a magnitude. The ray data structure may include one or more coordinates for specifying the ray, one or more attributes of the ray, and so forth. In one embodiment, the ray data structure includes two vectors for specifying the endpoints of the ray, each vector comprising three 32-bit floating point values for specifying the coordinates of a point relative to a global coordinate system, as well as one or more attributes such as flags that specify how particular types of graphics primitives encountered during the tree traversal operation are to be processed.

The interface 505 may notify the scheduler 510 of a ray event that indicates that the TTU 500 received an instruction requesting a tree traversal operation to be performed for a given ray data structure. The interface 505 may pass a ray identifier for the ray data structure stored in the local storage 502 to the scheduler 510 as part of the ray event.

As long as the queue includes at least one ray identifier that needs to be processed by the one or more traversal units 530, the scheduler 510 may choose a particular tree traversal operation from the queue to be launched on the one or more traversal units 530. The particular tree traversal operation may be selected by selecting one of the ray identifiers included in the queue of the scheduler 510. Any technically feasible means for selecting a particular ray identifier from the queue may be implemented by the scheduler 510, such as a priority-based algorithm, a round-robin algorithm, and the like.

In one embodiment, the scheduler 510 searches the queue for ray identifiers that are ready to be launched. The scheduler 510 may select a particular ray identifier ready to be launched and fetch the top element from the traversal stack data structure corresponding to the ray identifier. The top element may comprise a pointer to a node of the BVH. The scheduler 510 may then issue a fetch request to the L0 cache unit 570 to fetch the data corresponding to the pointer to the node. If the data is not currently stored in the L0 cache unit 570, then the data is fetched from memory and the scheduler 510, during the next clock cycle, may select another ray identifier from the queue to try and launch. However, if the data is currently stored in the L0 cache unit 570, then the scheduler 510 transmits a request to the setup unit 520 to launch the tree traversal operation for that node.

In one embodiment, the node represents the root node for a block of the BVH. The setup unit 520 and one or more traversal units 530 will be configured to traverse all of the nodes of the block, intersecting each node of the block with the ray data structure corresponding to that particular tree traversal operation. In one embodiment, the setup unit 520 fetches the ray data structure associated with the tree traversal operation from the local storage 502. The setup unit 520 may also fetch the data for the block including the node from the L0 cache unit 570. In one embodiment, the setup unit 520 performs one or more operations for preparing to execute the tree traversal operation. For example, in one embodiment, the setup unit 520 transforms the coordinates associated with the ray data structure from a global coordinate system to a local coordinate system associated with a root node of the block. In another embodiment, the setup unit 520 may test the root node of the block for intersection with the ray data structure. If the root node of the block intersects the ray data structure then each of the child nodes of the root node may be passed to a particular traversal unit 530 to continue traversing the BVH in parallel. In one embodiment, the TTU 500 may include four traversal units 530 to test up to eight child nodes for intersection with the ray in parallel. The number of traversal units 530 that are implemented in a given TTU 500 may be optimized for the types of trees that are typically traversed. In yet another embodiment, the setup unit 520 may transmit the root node of the block to one of the available tree traversal units 530.

When a node is received at a tree traversal unit 530 from the setup unit 520, the node is inserted into a local stack data structure. The local stack data structure is similar to the traversal stack data structure except the depth of the local stack data structure may be limited due to the fixed size of a block of the tree data structure. The traversal unit 530 then enters a loop where the traversal unit 530 determines if the local stack data structure is empty. If the local stack data structure is empty, then the traversal unit 530 has completed the traversal of the block. However, if the local stack data structure is not empty, then the traversal unit 530 pops the top entry from the local stack data structure. If the top entry is a leaf node and the leaf node intersects the ray data structure, then the data (e.g., geometric primitives) stored in the leaf node is added to a result queue. However, if the top entry is an internal node (i.e., a node that includes one or more child nodes, etc.), then the ray data structure is intersected with the node to determine if the ray intersects the node. If the ray data structure does not intersect the node, then nothing is added to the local stack data structure, and the loop is repeated if the local stack data structure is not empty. If the ray data structure intersects the node, then each of the child nodes of the node included in the block are added to the local stack data structure and the loop is repeated. However, if the child nodes of the intersected node are not included in the block (i.e., the child nodes are included in a different block of the tree data structure, etc.), then the child nodes may be added to the result queue. Once the local stack data structure is empty, the tree traversal operation for the block is complete and any data included in the result queue may be passed to the stack management unit 540.

The stack management unit 540 may read the result queue and update the traversal stack data structure in the local storage 504 by adding any child nodes included in the result queue to the top of the traversal stack data structure. The stack management unit 540 may also transmit any geometric primitives included in the result queue to the SM 340. Again, the geometric primitives included in the result queue were those primitives associated with nodes (i.e., bounding volumes) that intersected the ray and, therefore, are the results associated with a particular tree traversal operation intersecting the ray with the BVH. Once the traversal stack data structure in local storage 504 has been updated and the one or more traversal units 530 have indicated to the stack management unit 540 that the tree traversal of the block of the tree data structure is complete, the stack management unit 540 may indicate to the scheduler 510 that the tree traversal operation for the particular ray data structure is ready to be re-launched if the traversal stack data structure is not empty.

The preceding description of the TTU 500, in accordance with one embodiment, utilizes an optimized block-based tree traversal algorithm that is discussed in more detail below. It will be appreciated that the architecture of the TTU 500 may be optimized for different types of tree traversal algorithms, and that the architecture of the TTU 500 may be changed for different algorithms utilized for different types of hardware architectures. The block-based tree traversal algorithm is just one method for optimizing tree traversal operations on high-latency memory architecture systems such as the PPU 200. In one embodiment, the various units of the TTU 500 (e.g., the setup unit 520, the traversal unit 530, etc.) may be implemented as fixed function logic, configured to implement the functionality of each of the units described above. In another embodiment, one or more units of the TTU 500 may be programmable logic devices that are configured to execute instructions transmitted to the TTU 500 by the SM 340 or read from the memory 204. The units may execute the instructions to implement the functionality of each of the units described above in a programmable manner. For example, the traversal units 530 may be programmable devices configured to execute a program stored in the memory 204 to process one or more nodes of the tree data structure.

Figure 6A:
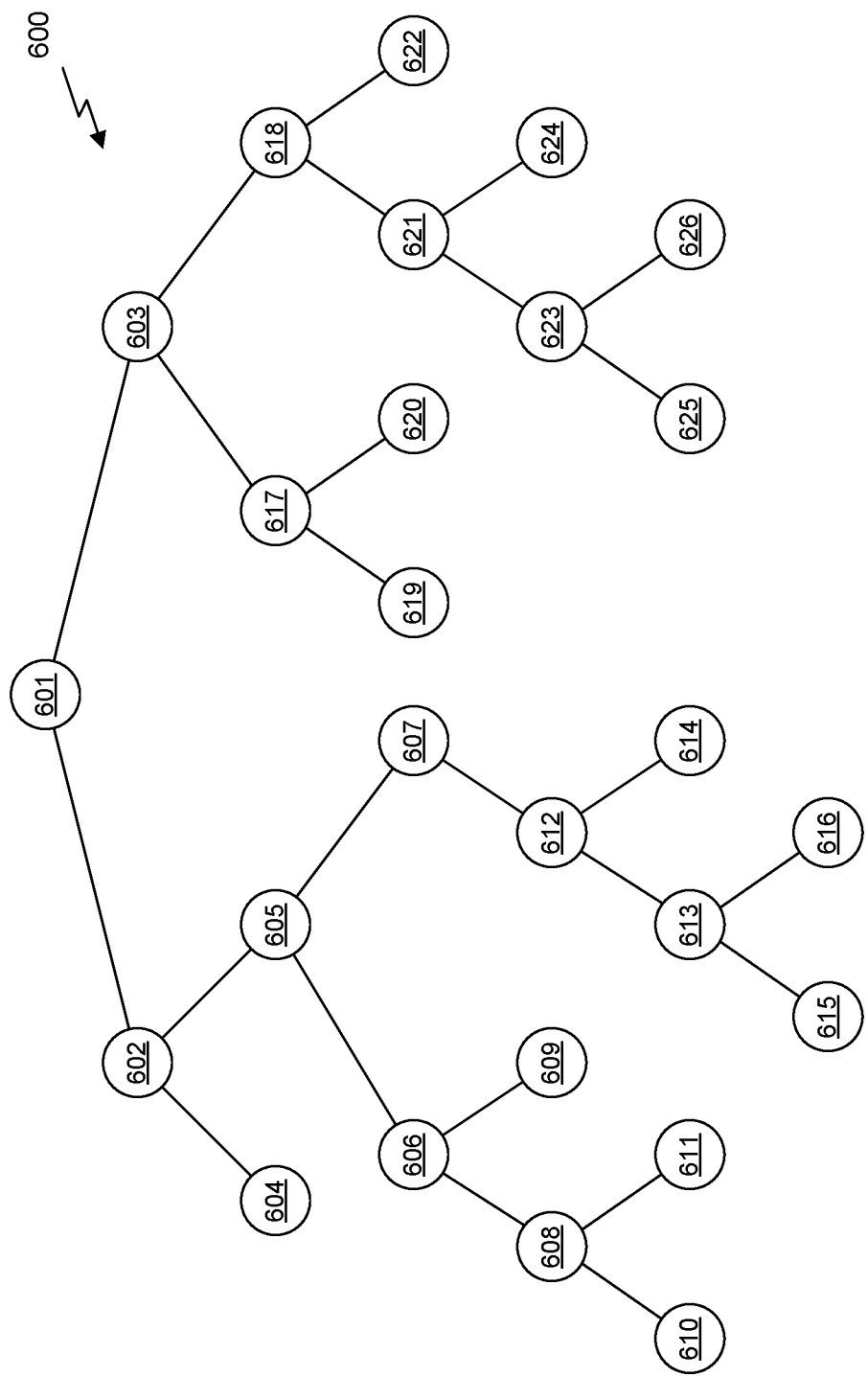
FIGS. 6A & 6B illustrate a typical tree data structure that represents a bounding volume hierarchy (BVH) associated with a 3D model, in accordance with the prior art.
Figure 6B:
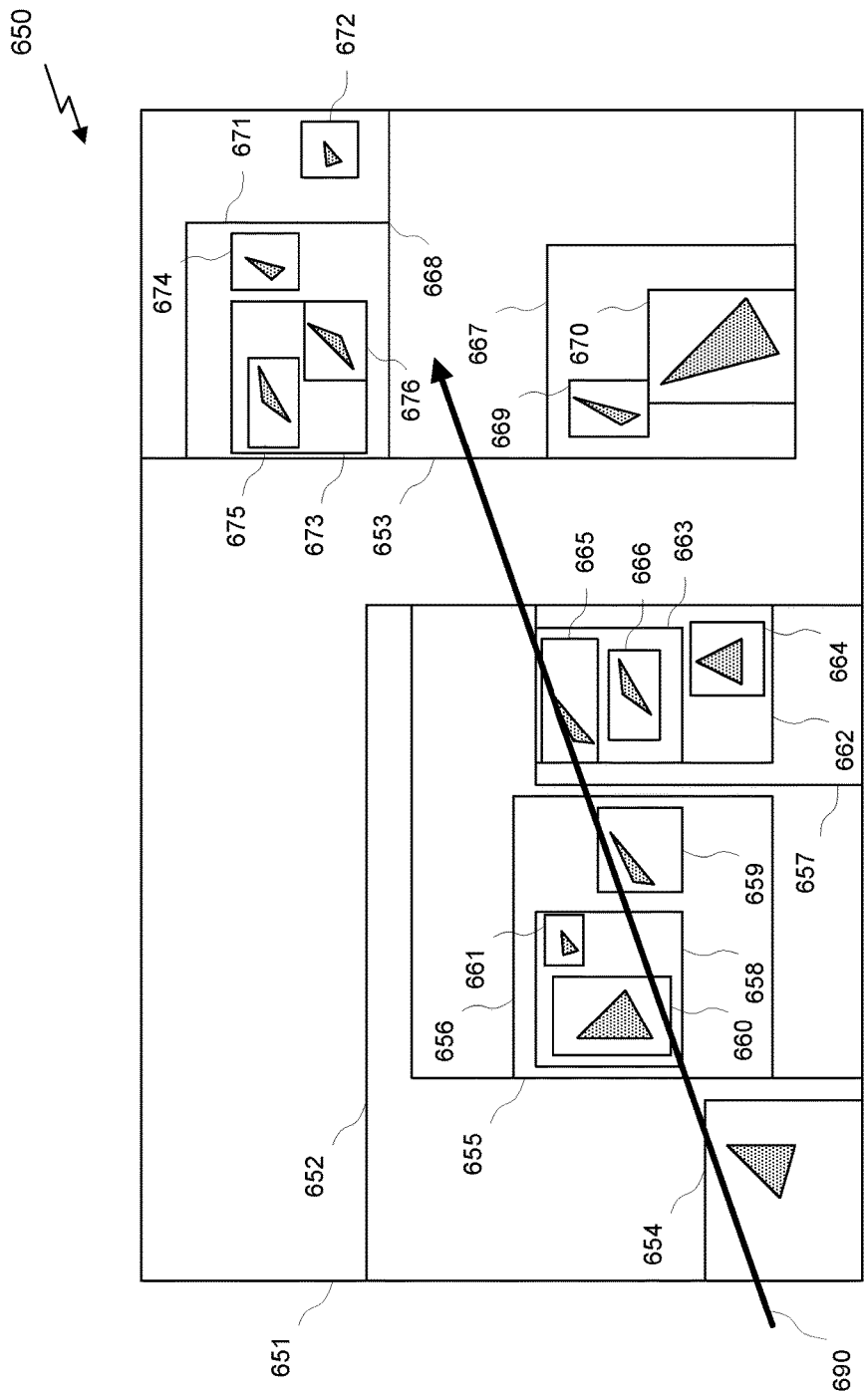

FIGS. 6A & 6B illustrate a typical tree data structure 600 that represents a bounding volume hierarchy (BVH) 650 associated with a 3D model, in accordance with the prior art. The tree data structure 600 includes a plurality of nodes, and each node has zero or more child nodes. The tree data structure 600 includes a root node 601 that indicates the start of the tree data structure 600. All other nodes in the tree data structure 600 descend from the root node 601. Nodes having zero child nodes may be referred to as leaf nodes. Leaf nodes may include one or more elements or a pointer to one or more elements stored in the tree data structure 600. Leaf nodes may be associated with a bounding volume that encloses the elements of the 3D model associated with the leaf node. For example, the elements may include geometric primitives of the 3D model. The tree data structure 600 includes leaf nodes 604, 609, 610, 611, 614, 615, 616, 619, 620, 622, 624, 625, and 626. Nodes that include one or more child nodes may be referred to as internal nodes. Internal nodes may be associated with a bounding volume that encloses the elements of the 3D model associated with the descendent leaf nodes of the internal node. The tree data structure 600 includes internal nodes 601, 602, 603, 605, 606, 607, 608, 612, 613, 617, 618, 621, and 623.

As shown in FIG. 6A, the tree data structure 600 is a binary tree data structure. In one embodiment, the binary tree data structure represents a BVH 650 associated with a 3D scene or 3D model that includes a number of geometric primitives, as shown in FIG. 6B. It will be appreciated that the tree data structure 600 is shown for illustration only and is quite small when compared to tree data structures generated from typical 3D models in, for example, computer graphics. Such tree data structures may contain thousands or millions of nodes.

As shown in FIG. 6B, a 3D model comprising a number of geometric primitives (i.e., the shaded triangles) may be associated with a BVH 650. In other words, each geometric primitive may be associated with a bounding volume that fully encloses the geometric primitive and then multiple geometric primitives in close proximity may be bounded by a higher-level bounding volume. The hierarchy is established through multiple levels of larger and larger bounding volumes until a single bounding volume encloses all of the lower-level bounding volumes. The single bounding volume may be associated with the root node 601 in the tree data structure 600.

It will be appreciated that the illustration of the BVH 650 is shown in two dimensions, rather than three dimensions, and that the bounding volumes are illustrated as bounding rectangles. However, the abstract concepts illustrated herein for a two-dimensional system may be applied equally as well to higher-dimensional system (e.g., a three-dimensional system, etc.) using, for example, axis-aligned bounding boxes (AABB). In addition, the bounding volumes are not limited to AABBs. In other embodiments, bounding volumes may be spheroid, cylindrical, or any other closed geometric surface.

As shown in FIG. 6B, the BVH 650 includes bounding boxes 651, 652, 653, 655, 656, 657, 658, 662, 663, 667, 668, 671, and 673, which correspond to nodes 601, 602, 603, 605, 606, 607, 608, 612, 613, 617, 618, 621, and 623 of the tree data structure 600, respectively. These bounding boxes contain one or more additional lower-level bounding boxes. Similarly, the BVH 650 includes bounding boxes 654, 659, 660, 661, 664, 665, 666, 669, 670, 672, 674, 675, and 676, which correspond to nodes 604, 609, 610, 611, 614, 615, 616, 619, 620, 622, 624, 625, and 626 of the tree data structure 600, respectively. These bounding boxes contain one or more geometric primitives and, therefore, are represented in the tree data structure 600 by the leaf nodes.

FIG. 6B also shows a ray 690 that is associated with a tree traversal operation. Ray-tracing techniques, for example, involve the operation of intersecting a plurality of rays with the geometric primitives of a model. One method of performing the ray-tracing operations is to generate a tree data structure that represents the model. Then, for each ray generated by the rendering algorithm, the ray is tested against the tree data structure to determine which geometric primitives are intersected by the ray. The tree data structure significantly decreases the time required to determine which geometric primitives are intersected by the ray by discarding large groups of geometric primitives when a bounding volume that contains all the geometric primitives is not intersected by the ray.

Figure 7A:
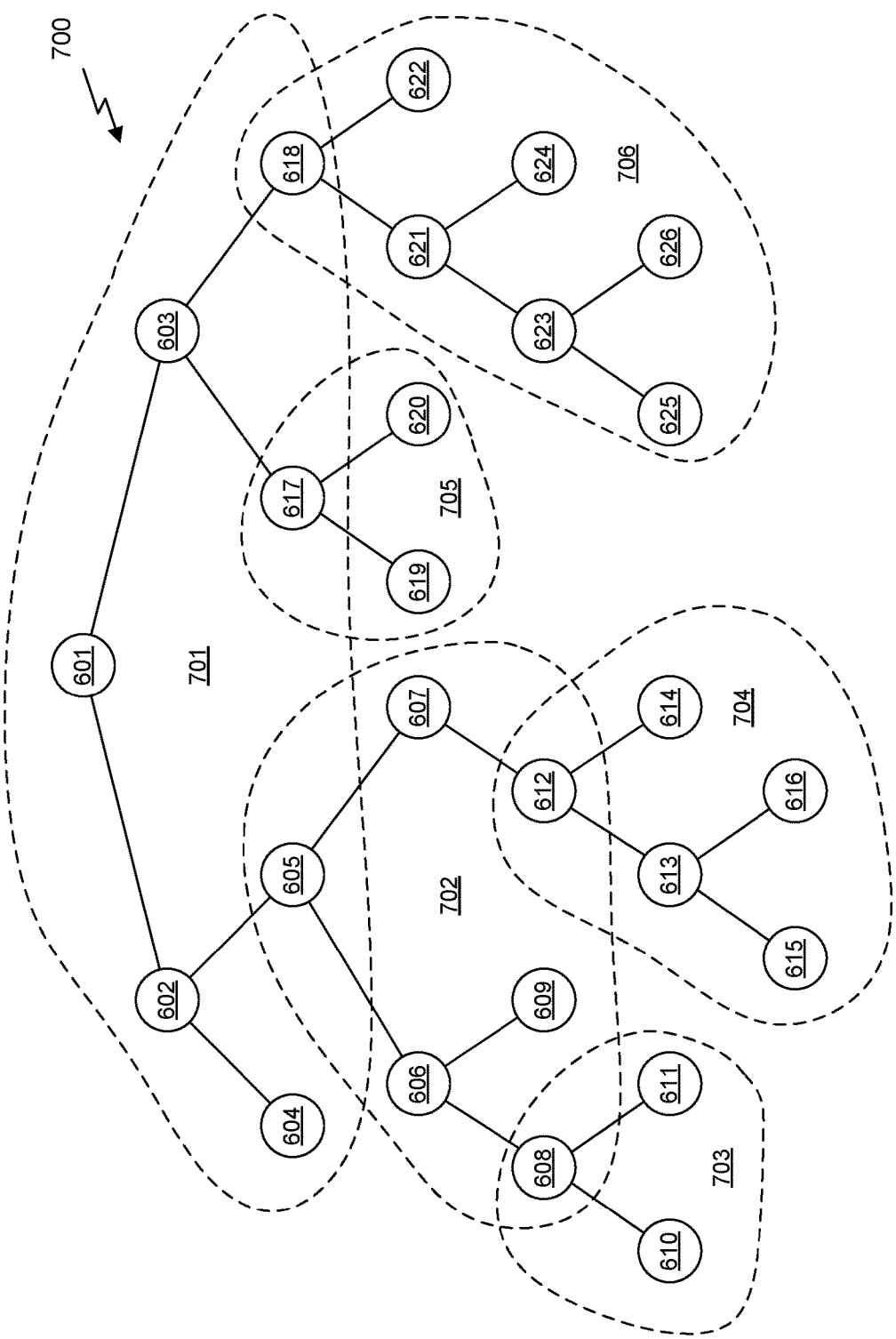
FIG. 7A illustrates a tree data structure subdivided into blocks for purposes of compression, in accordance with one embodiment.

FIG. 7A illustrates a tree data structure 700 subdivided into blocks for purposes of compression, in accordance with one embodiment. The tree data structure 700 is similar to the tree data structure 600 of FIG. 6A in that the topology of the tree with respect to each of the nodes 601-626 is the same and that the nodes 601-626 are each associated with the bounding volumes shown in FIG. 6B. However, the plurality of nodes 601-626 of the tree data structure 700 have been grouped into blocks for purposes of compression. In other words, subsets of nodes have been grouped together to be stored in contiguous portions of memory and compressed in order to decrease the size of the tree data structure 700.

As shown in FIG. 7A, the tree data structure 700 includes six compression blocks, each compression block containing a variable number of nodes of the tree data structure 700. A first compression block 701 includes the root node 601 as well as nodes 602, 603, 604, 605, 617, and 618; a second compression block 702 includes the nodes 605, 606, 607, 608, 609, and 612; a third compression block 703 includes the nodes 608, 610, and 611; a fourth compression block 704 includes the nodes 612, 613, 614, 615, and 616; a fifth compression block 705 includes the nodes 617, 619, and 620; and a sixth compression block 706 includes the nodes 618, 621, 622, 623, 624, 625, and 626.

In one embodiment, each compression block is stored in a contiguous portion of memory. A compression block may encode a fixed or a variable number of nodes. In one embodiment, the size of a compression block is fixed at the size of a memory transaction quantum associated with the hardware architecture. As used herein, a memory transaction quantum refers to a plurality of bits that are grouped together as part of a memory transaction. In one embodiment, the memory transaction quantum may equal a number of bits that fill a cache line of the L0 cache unit 570. For example, if a cache line of the L0 cache unit 570 is 128 bytes wide, then the size of a compression block may be fixed at 128 bytes.

It will be appreciated that, as shown in FIG. 7A, some nodes of the tree data structure 700 are included in two compression blocks: a "leaf" node in one compression block and a "root" node in another compression block. For example, node 605 is included in both the first compression block 701 and the second compression block 702. Nodes 605, 608, 612, 617, and 618 may be referred to herein as external nodes. These external nodes are encoded as a root node of a one compression block (i.e., a block root node) and a transition node of another compression block. A transition node may be encoded similar to an internal node of the compression block, but the transition node may also include a pointer to the compression block having a block root node associated with the external node. For example, node 605 is encoded as a block root node of the second compression block 702. However, a transition node associated with external node 605 is encoded as a "leaf" node of the first compression block 701. As used herein, a "leaf" node of a compression block may refer to an actual leaf node of the tree data structure (i.e., a node that includes pointer(s) to one or more elements such as geometric primitives) or an internal node of the tree data structure that is encoded within two different compression blocks. In other words, a leaf node of a compression block has no other descendent child nodes within that compression block and would appear to be a leaf node if the tree data structure was limited to only that compression block.

FIG. 7B illustrates the structure of a compression block data structure 750, in accordance with one embodiment. In one embodiment, all data for a compression block should be contained within a contiguous portion of memory. The width of the contiguous portion of memory may be equal to a size of a single memory transfer quantum, such as a width of a cache line stored in the L0 cache unit 570.

Each compression block encodes a representation of a plurality of nodes in the tree data structure 700 within a plurality of corresponding fields 751-757 of the compression block data structure 750. For example, a first compression block 701 may be encoded in a compression block data structure 750 by encoding data associated with nodes 601, 602, 604, 605, 603, 617, and 618 in fields 751, 752, 753, 754, 755, 756, and 757, respectively, in a depth-first manner. Alternatively, the first compression block 701 may be encoded in a compression block data structure 750 by encoding data associated with nodes 601, 602, 603, 604, 605, 617, and 618 in fields 751, 752, 753, 754, 755, 756, and 757, respectively, in a breadth-first manner.

In one embodiment, a first field 751 of the compression block data structure 750 encodes a block root node for the compression block. In the case of the first compression block 701 of the tree data structure 700, the node 601 may be encoded as the block root node in the first field 751. In the case of the second compression block 702 of the tree data structure 700, the node 605 may be encoded as the block root node in the first field 751. Once the block root node has been encoded, the additional nodes of the compression block may be encoded in the compression block data structure 750. Again, the nodes may be encoded in a depth-first topology or a breadth-first topology, depending on the implementation.

Each field of the compression block data structure 750 may include a node type identifier. In one embodiment, the node type identifier may comprise a one-bit identifier that indicates whether the node is a leaf node or an internal node. Again, a leaf node is a node that is associated with zero child nodes and includes an element of the data represented by the tree data structure. For example, a leaf node may include a pointer or pointers to one or more geometric primitives of a 3D model. In contrast, an internal node is a node that is associated with one or more child nodes and does not include an element of the data represented by the tree data structure.

In another embodiment, the node type identifier may comprise a two-bit identifier (e.g., 0b00, 0b01, 0b10, or 0b11), which specifies whether the node is an internal node, a transition node, or a leaf node, where one of the bit combinations is reserved for future use. In yet another embodiment, the two-bit node type identifier may specify whether the node is associated with zero child nodes (i.e., a leaf node), associated with a left child node, associated with a right child node, or associated with a left child node and a right child node. In yet another embodiment, the two-bit node identifier specifies whether the node is a block root node, an internal node, a transition node, or a leaf node. In yet another embodiment, each node type may correspond to a single bit of the node type identifier, where only one bit of the node type identifier is set for valid node type identifiers (e.g., 0b100, 0b010, and 0b001 are valid node type identifiers for three different types of nodes). It will be appreciated that additional node types may be specified with a node identifier having more than two bits, if needed for a particular implementation.

FIG. 7C illustrates a data structure 760 for encoding a node in a field of the compression block data structure 750 using two sub-fields, in accordance with one embodiment. In one embodiment, a block root node may be encoded using two sub-fields. As shown in FIG. 7C, the data structure 760 may include a first sub-field 761 for specifying a node type identifier for the corresponding node and a second sub-field 762 for encoding the bounding volume and/or local coordinate system associated with the node. The node type identifier may be, e.g., a two-bit identifier. The bounding volume and/or local coordinate system may be encoded using any feasible technique. For example, values specifying the planes of an AABB associated with the block root node or values specifying the origin and extents of a local coordinate system associated with the block root node may be encoded within the second sub-field 762.

In one embodiment, an internal node may also be encoded using two sub-fields. The data structure 760 may include a first sub-field 761 for specifying a node type identifier for the corresponding node and a second sub-field 762 for encoding the bounding volume associated with the node. Although not shown explicitly in FIG. 7C, the number of bits required to encode the bounding volume of an internal node of the compression block within the second sub-field may be less than the number of bits required to encode the bounding volume and/or local coordinate system for the block root node. In some cases, the number of bits required to encode the bounding volume of an internal node may be less because the encoded values may be specified relative to the bounding volume and/or local coordinate system of the block root node.

FIG. 7D illustrates a data structure 770 for encoding a node in a field of the compression block data structure 750 using three sub-fields, in accordance with one embodiment. In one embodiment, a leaf node may be encoded using three sub-fields. As shown in FIG. 7D, the data structure 770 may include a first sub-field 771 that specifies a node type identifier for the node, a second sub-field 772 for encoding the bounding volume associated with the node, and a third sub-field 773 that includes a pointer or pointers to the element or elements stored within the leaf node. Again, the node type identifier may be, e.g., a two-bit identifier. The bounding volume may be encoded using any feasible technique, including specifying the values associated with the bounding volume relative to the bounding volume and/or local coordinate system of the block root node in order to reduce the number of bits required to encode the values within the second sub-field 772. The pointer or pointers may be specified as a memory address, such as a 32-bit memory address within the memory architecture hierarchy.

In one embodiment, a transition node may also be encoded using three sub-fields. The data structure 770 may include a first sub-field 771 that specifies a node type identifier for the node, a second sub-field 772 for encoding the bounding volume associated with the node, and a third sub-field 773 that includes a pointer to the "child" compression block associated with the transition node. Again, the node type identifier may be, e.g., a two-bit identifier, and the bounding volume may be encoded using any feasible technique, including specifying the values associated with the bounding volume relative to the bounding volume and/or local coordinate system of the block root node in order to reduce the number of bits required to encode the values within the second sub-field 772. In one embodiment, the pointer to the "child" compression block may be specified as a memory address, such as a 32-bit memory address within the memory architecture hierarchy.

If the tree data structure 700 were unrestricted and any compression block were allowed to reside in any contiguous portion of memory, then each transition node would require a pointer to a particular memory address to locate the corresponding compression block in the memory. However, the location of particular compression blocks of the tree data structure 700 may be restricted to specific locations in memory in order to reduce the number of bits required to encode compression blocks including two or more transition nodes. When a particular compression block of the tree data structure has two or more transition nodes that point to two or more corresponding "child" compression blocks, then the two or more "child" compression blocks may be restricted to be stored in contiguous memory locations. This restriction may be exploited by the encoding technique.

In one embodiment, when the compression block includes two or more transition nodes, a node indexing technique may be employed to encode pointers associated with the two or more transition nodes. A pointer for a first transition node may be explicitly encoded as part of the compression block data structure 750, and pointers for the other transition nodes are not encoded explicitly within the compression block data structure 750 but instead are implicitly encoded based on the topology of the nodes within the compression block data structure 750. For example, a first transition node within the compression block (as ordered according to a depth-first or breadth-first traversal of the nodes within the compression block, as the case may be) may encode a pointer to a location in memory in the third sub-field 773 using, e.g., a full 32-bit memory address. None of the other transition nodes need to encode a pointer to their child nodes because the pointers associated with these transition nodes may be calculated based on an offset from the pointer for the first transition node. As stated above, all "child" compression blocks for transition nodes of a particular compression block are restricted to be stored in contiguous locations in memory. Thus, a pointer to a particular "child" compression block may be calculated by multiplying a transition node index (starting at 0 for the first transition node, 1 for the second transition node, and so forth) by the size of the compression block data structure (e.g., the size of a cache line) and adding this offset to the pointer associated with the first transition node.

For example, the first compression block 701 of the tree data structure 700 includes three transition nodes corresponding to the second compression block 702, the fifth compression block 705, and the sixth compression block 706. The first compression block 701 is encoded within a first compression block data structure 750. The second compression block 702 may be encoded within a second compression block data structure 750 at a first memory address; the fifth compression block 705 may be encoded within a fifth compression block data structure 750 at a second memory address, and the sixth compression block 706 may be encoded within a sixth compression block data structure 750 at a third memory address. The second memory address may be offset from the first memory address by the size of a compression block data structure, and the third memory address may be offset from the second memory address by the size of a compression block data structure. The field for the first transition node (e.g., node 605) within the first compression block data structure 750 may include a pointer to the first memory address. However, the fields for the second transition node (e.g., node 617) and the third transition node (e.g., node 618) do not include a pointer to the fifth compression block data structure 750 and the sixth compression block data structure 750, respectively, because the location of the second memory address and the third memory address can be inherently calculated relative to the first memory address.

In another embodiment, a similar technique can be applied to leaf nodes, where the elements of all leaf nodes within a given compression block may be stored in contiguous locations in memory. If elements may vary in size, such that an element in one leaf node may be larger than the element in another leaf node, then the pointers in the compression block may be indirect pointers that point to a number of intermediate pointers stored in contiguous portions of memory. Each of the intermediate pointers may then point to the actual elements in a different location in memory, which may be either contiguous or non-contiguous. While the use of indirect pointers in this manner may not reduce the need to store a full pointer in memory for each element represented by the tree data structure 700, the indirect pointers will not need to be read from memory until after the tree traversal operation has determined that a particular query data structure intersects the corresponding leaf node of that indirect pointer and, therefore, the tree traversal operation may be made more efficient by reducing the size of the compression block data structure for a particular number of nodes.

As shown in FIGS. 7A-7D, each node of the tree data structure 700 is encoded in a different field of the compression block data structure 750. In another embodiment, the data for each of the nodes of the compression block may be interspersed in the encoding structure. A first field of the compression block data structure 750 may encode a topology of the compression block. Additional fields of the compression block data structure 750 may encode, e.g., a local coordinate system for the compression block, values specifying each of the bounding volumes of the nodes in the compression block, pointer(s) to one or more elements included in leaf nodes of the compression block, and so forth.

For example, the topology of the compression block may be encoded by storing a bit string in the first field that indicates whether each child node in the compression block is an internal node or a "leaf" node. Again, a leaf node may refer to an actual leaf node of the tree data structure or an external node associated with a separate compression block. In this example, the first compression block 701 may be encoded as the bit stream 0b100100, and the second compression block 702 may be encoded as the bit stream 0b10010, the third compression block 703 may be encoded as the bit stream 0b00, and so forth. The previous example illustrates the topology encoded using one bit per node to distinguish between a leaf node and an internal node. In an alternate embodiment, each node may be encoded using more than two bits to determine whether each node is an internal node, a transition node, or a leaf node (i.e., a true leaf node of the tree data structure 700). For example, an internal node may be encoded with the two bit combination 0b01, a transition node may be encoded with the two bit combination 0b10, and a leaf node may be encoded with the two bit combination 0b11. Therefore, the first compression block 701 may be encoded as the bit stream 0b011110011010, and the second compression block 702 may be encoded as the bit stream 0b0110110110, the third compression block 703 may be encoded as the bit stream 0b1111, and so forth.

It will be appreciated that the aforementioned examples include a variable number of nodes encoded as part of the compression block. In one embodiment, each compression block includes a fixed number of nodes. For example, a compression block may encode up to three hierarchical levels of a binary tree, storing a total of up to seven nodes within the compression block data structure 750. Where there is no actual node at a specific location in the compression block, the bit stream may indicate the absence of a node using a particular bit combination, such as 0b00. So, for example, the second compression block 702 could be encoded as the bit stream 0b011011011000, the third compression block 703 may be encoded as the bit stream 0b110000110000, and so forth.

It will be appreciated that once the topology of the compression block is known, the rest of the compression block data structure 750 may be read to determine values associated with each node. For example, the first field may be followed by a second field that includes a number of bit masks that indicate which values of the bounding volumes are provided for each node encoded within the compression block, the second field may be followed by a number of fields that list various values for the bounding volumes, these fields may be followed by a field including one or more pointers associated with any leaf nodes or transition nodes in the compression block, and so forth. As the preceding description makes clear, any technically feasible manner for encoding the data associated with each of the nodes of the compression block is within the scope of the compression block data structure 750 shown in FIG. 7A. Furthermore, in some embodiments, various compression mechanisms, such as run-length encoding, may be used to fit more nodes into a particular compression block data structure 750 having a limited width than could otherwise be encoded without compression.

The technique for encoding the tree data structure 700 using compression blocks, as described above, can be utilized to further enhance the efficiency of a tree traversal operation using the TTU 500 of FIG. 5. For example, instead of doing a depth-first traversal of the tree-data structure 700, the algorithm for the tree traversal operation may exploit the fact that all data from a particular compression block is included in a single cache line. The tree traversal algorithm could modify the depth-first approach by ensuring that all nodes in a particular compression block are processed before any other nodes in different compression blocks are traversed. In other words, the tree traversal operation may implement a depth-first traversal that is compression block aware.

Figure 8A:
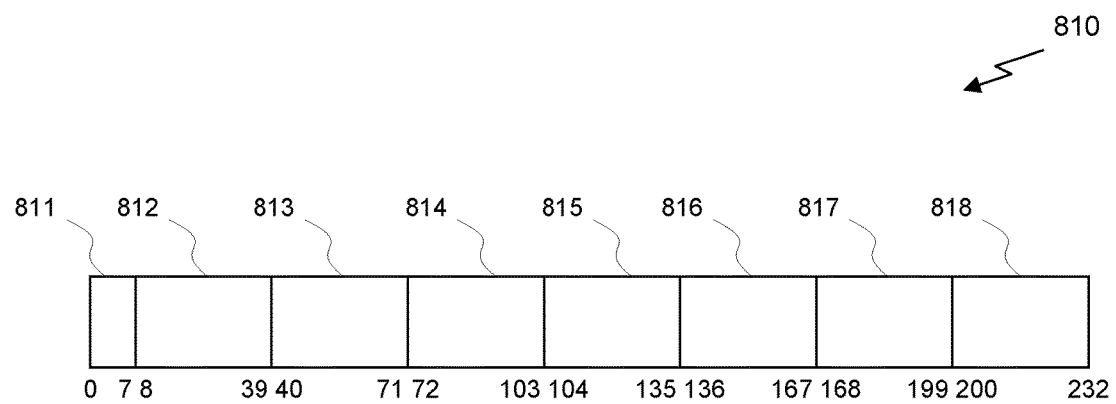
FIGS. 8A-8B illustrate various representations for different types of nodes encoded in the compression block data structure of FIG. 7B, in accordance with another embodiment.
Figure 8B:
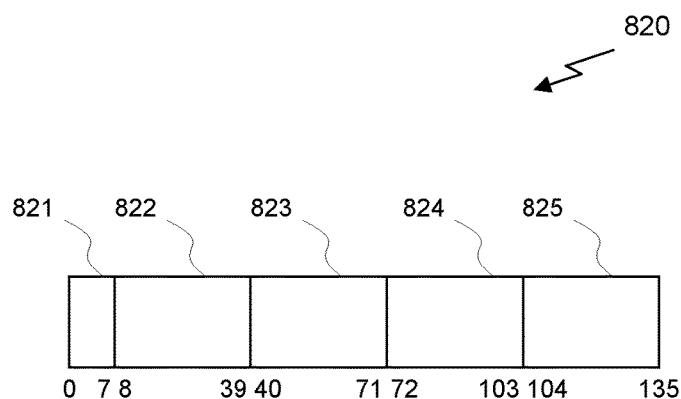

FIGS. 8A-8B illustrate various representations for different types of nodes encoded in the compression block data structure 750 of FIG. 7B, in accordance with another embodiment. Again, each node of the compression block may be encoded within a different field of the compression block data structure. Because all of the nodes within a given compression block are related to the other nodes of the compression block, the amount of data used to store certain types of bounding volumes within the compression block may be reduced.

In one embodiment, the bounding volumes associated with each of the nodes are axis-aligned bounding boxes (AABB) that may be defined as six planes associated with a coordinate system. For example, a Cartesian coordinate system may be defined by three orthonormal vectors, x, y, and z. For a 3D model based on a Cartesian coordinate system having a particular origin given as $<x_0, y_0, z_0>$, an axis aligned bounding box (AABB) may be defined using a sextuple of values $<x_1, x_2, y_1, y_2, z_1, z_2>$. The values $x_1$ and $x_2$ define a minimum plane (i.e., the set of all points $<x, y, z>$ where $x=x_1$, etc.) and a maximum plane (i.e., the set of all points $<x, y, z>$ where $x=x_2$, etc.) parallel to the plane defined by the y-axis and the z-axis that bounds all of the geometric primitives enclosed by the AABB. The values $y_1$ and $y_2$ define a minimum plane (i.e., the set of all points $<x, y, z>$ where $y=y_1$, etc.) and a maximum plane (i.e., the set of all points $<x, y, z>$ where $y=y_2$, etc.) parallel to the plane defined by the x-axis and the z-axis that bounds all of the geometric primitives enclosed by the AABB. The values $z_1$ and $z_2$ define a minimum plane (i.e., the set of all points $<x, y, z>$ where $z=z_1$, etc.) and a maximum plane (i.e., the set of all points $<x, y, z>$ where $z=z_2$, etc.) parallel to the plane defined by the x-axis and the y-axis that bounds all of the geometric primitives enclosed by the AABB.

As set forth above, a block root node may be encoded within a first field 751 of the compression block data structure 750. In one embodiment, a block root node may be encoded within the compression block data structure 750 by storing the data structure 810 in the first field 751 of the compression block data structure 750. As shown in FIG. 8A, the data structure 810 includes a first sub-field 811 for encoding a node type identifier for the block root node. Again, the node type identifier may be one-bit for encoding two different node types; two-bits for encoding four different node types; or three or more bits for encoding a larger combination of node types.

In one embodiment, each sub-field of the data structure 810 is byte aligned. In other words, the first sub-field 811 is eight bits. If a two-bit node type identifier is implemented, then the first two bits (i.e., bits 0 and 1) of the data structure 810 may encode the node type identifier. The other six bits of the first sub-field 811 may be reserved for future use. For example, if the block root node is an internal node, the node type identifier may be set to 0b01. In some cases, the block root node may be a leaf node (i.e., where the compression block includes only the block root node) and then the node type identifier may be set to 0b10.

The next six sub-fields 812, 813, 814, 815, 816, and 817 may be used to encode six 32-bit floating point values that specify the AABB planes for the block root node. Again, sub-fields 812, 813, 814, 815, 816, and 817 may encode the six values $x_1$, $x_2$, $y_1$, $y_2$, $z_1$, and $z_2$, respectively. In alternate embodiments, the six values that specify the AABB planes may be encoded with a different format, such as 16-bit fixed point format, 64-bit floating point format, or any other format for encoding numbers.

In one embodiment, the amount of data required to specify an AABB associated with nodes that descend from the block root node may be reduced. For example, an AABB of a child node of a given parent node may share one or more of the six planes of the AABB of the parent node. In such cases, the child node may specify which values that define the six planes of the AABB are new, and therefore included in the field encoding the child node, and which values are inherited from the AABB of the parent node. Consequently, even though all six values of the AABB planes for the block root node are specified in the data structure 810, less than six values of the AABB planes may be specified in the data structures for each of the remaining nodes in the compression block.

A data structure 820 for encoding a child node related to a parent node is shown in FIG. 8B. Again, a first sub-field 821 may include the node type identifier, such as a two-bit value 0b01 that indicates the node is an internal node. The first sub-field 821 may also include a six bit mask that indicates which values of an AABB associated with a parent node of the child node are inherited by the child node. For example, bits 2 through 7 of the first sub-field may comprise a bit mask having six bits, one bit for each of the six planes of the parent node's AABB. If the child node inherits a value from the AABB of the parent node, then a corresponding bit is set in the bit mask (in some embodiments, the representation of inherited values or new values by set bits or cleared bits may be reversed so that if the child node specifies a new value from the AABB of the parent node, then a corresponding bit is set in the bit mask). At least one other sub-field of the data structure 820, e.g., sub-fields 822, 823, and 824, may encode new values for the AABB of the child node. As shown in FIG. 8B, the data structure 820 includes three additional sub-fields 822, 823, and 824 for three new values of the AABB, indicating that three values, as specified by the bit mask in the first sub-field 821, are inherited from the AABB of a parent node. It will be appreciated that although three sub-fields are included in the data structure 820 for encoding new values of an AABB for the child node, a variable number of sub-fields, from one to six, may be included in the data structure 820 based on the number of set bits in the bit mask of the first sub-field 821. For example, if zero bits of the bit mask are set, then data structure 820 would include six sub-fields for encoding six new values for the AABB associated with the child node. Similarly, if five bits of the bit mask are set, then then data structure 820 would include one sub-field for encoding a single new value for the AABB associated with the child node, where the other five values are inherited from the parent node.

In one embodiment, all AABBs for nodes within the compression block may inherit values only from the block root node of the compression block rather than the direct parent node of the particular node. In other words, an AABB for a particular node may inherit a value from the AABB of the block root node, even though the particular node is not a direct child node of the block root node and one or more intervening nodes may be located between the particular node and the block root node in the tree. The child node may not inherit any values directly from their corresponding parent nodes unless the parent node is also the block root node.

If the child node is also a transition node or a leaf node, then at least one sub-field, such as sub-field 825, may store a pointer (e.g., a 32-bit address, etc.) that specifies a location in memory 204. If the child node is a transition node, then the pointer may specify a location for an associated compression block data structure in the memory 204. If the child node is a leaf node, then the pointer may specify a location of an element of the data represented by the tree, pointers to multiple elements of data represented by the tree, or a pointer to a collection of multiple elements of data represented by the tree in the memory 204. Techniques discussed above for storing pointers using node indexing techniques may also be employed.

As discussed above, the child nodes may include a bit mask that indicates which values of the AABB of the child node are inherited from an AABB of a parent node. In alternative embodiments, the parent nodes may include a bit mask that indicates which values of the AABB of the parent node are inherited by each child node of the parent node. For example, the first sub-field 811 of the data structure 810 may be 16 bits wide and include a two-bit node type identifier at bits 0 and 1 as well as a 12-bit mask at bits 4 through 15, where bits 2 and 3 are reserved. The bit mask specifies which, if any, values of the AABB of a parent node are inherited by the left child node and the right child node, where the first six bits of the bit mask indicate the inherited values for the left child node and the last six bits of the bit mask indicate the inherited values for the right child node. In other words, data for a parent node includes the information about which values of the parent node are inherited by the child node. In these embodiments, the leaf nodes would not include a mask.

In another embodiment, each child node may include a fixed number of values for specifying planes of the AABB for the child node. The fixed number of values may be less than the full number of values for specifying an AABB. For example, each child node may only encode 3 values for 3 of the planes of the AABB, where three other values of the AABB of the child node are inherited from the parent node. Because there are only a limited number of combinations of which three planes are inherited and which three planes are new, an integer may be used to encode the inheritance information for a child node rather than a bit mask. For example, there are twenty different combinations of inheriting three planes and specifying three new planes of a six plane AABB. These twenty different combinations can be encoded using a 5-bit integer rather than a 6-bit mask. If either two planes or four planes are inherited and four planes or two planes are specified for each child node, respectively, then a four-bit integer may be encoded rather than a 6-bit mask. Similarly, where a parent node includes a bit mask specifying inheritance for each of two child nodes, two n-bit integers may be used instead of a 12-bit mask.

It will be appreciated that, in some implementations of a BVH using AABBs, all six planes of an AABB of a parent node will be inherited by the AABBs of the child nodes. This fact is a direct result of the AABB of a parent node being calculated as the union of the AABBs of the child nodes. In other words, each plane of the AABB of the parent node is a minimum plane or maximum plane for a particular axis of all AABBs for the child nodes of the parent node. Consequently, at least six planes of the AABBs of the child nodes will be inherited from the AABB of the parent node. By always specifying a fixed number of planes as inherited and a fixed number of planes as newly specified, only a subset of all possible combinations of an n-bit bit mask are possible. Therefore, these combinations may be specified using a number of bits less than n-bits to specify an index into a table of these possible combinations. For example, if 4 child AABB planes are newly specified out of a possible 12 planes for two child AABBs, then there are only 495 possible combinations of a 12-bit mask, which may be encoded using 9 bits.

Relative Encoding

Figure 9A:
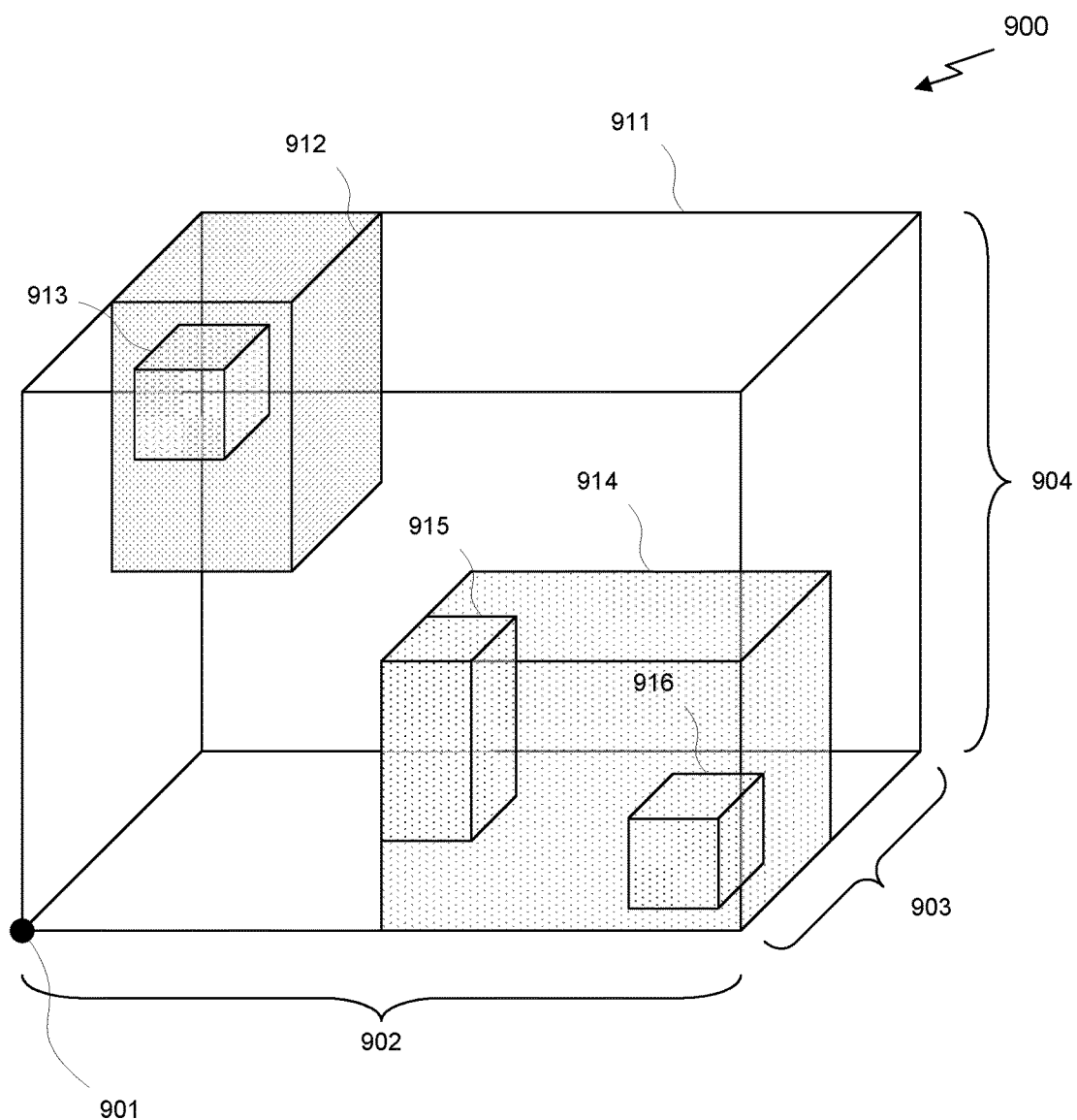
FIGS. 9A & 9B illustrate a bounding volume hierarchy associated with a tree data structure, in accordance with one embodiment.
Figure 9B:
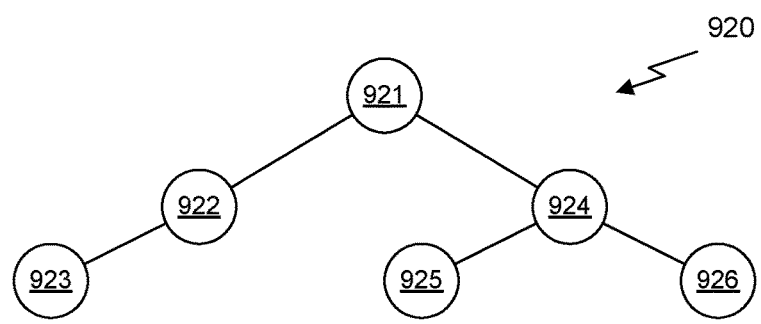

FIGS. 9A & 9B illustrate a bounding volume hierarchy 900 associated with a tree data structure 920, in accordance with one embodiment. As shown in FIGS. 9A & 9B, a root node of the tree data structure 920 is associated with a bounding volume such as an AABB 911. The root node may enclose one or more child nodes associated with additional bounding volumes such as a first child node associated with AABB 912 and a second child node associated with AABB 914. Those child nodes may enclose one or more additional child nodes associated with additional bounding volumes, such as a first child node associated with AABB 913 in one instance and a first child node associated with AABB 915 and a second child node associated with AABB 916 in another instance.

A root node 921 corresponds to AABB 911, a child node 922 corresponds to AABB 912, a leaf node 923 corresponds to AABB 913, a child node 924 corresponds to AABB 914, a leaf node 925 corresponds to AABB 915, and a leaf node 926 corresponds to AABB 916. In one embodiment, the node 921 represents a root node of a compression block for encoding the bounding volume hierarchy 900.

In order to encode the tree data structure 920, each of the AABBs 911-916 needs to be encoded in some manner. In one embodiment, all of the AABBs within a single compression block are encoded relative to the AABB of the root node for the compression block. For example, the AABB 911 of the root node 921 for the compression block is encoded and then AABB 912 of child node 922 and AABB 914 of child node 924 are encoded relative to the AABB 911 of the root node 921. Similarly, the AABB 913 of leaf node 923 is encoded relative to AABB 911 of the root node 921 and the AABB 915 of leaf node 925 and the AABB 916 of leaf node 926 are encoded relative to AABB 911 of the root node 921 as well.

In one embodiment, the AABB 911 is encoded using six high-precision values that specify each of the six planes of the AABB 911 relative to a global coordinate system. The six values may be, e.g., 32-bit floating point values, 32-bit fixed point values, 64-bit floating point values, or any other format for a high-precision value well-known in the art. For example, the AABB 911 may be encoded using a first 32-bit floating point value that specifies a minimum x-coordinate value of the AABB 911, a second 32-bit floating point value that specifies a maximum x-coordinate value of the AABB 911, a third 32-bit floating point value that specifies a minimum y-coordinate value of the AABB 911, a fourth 32-bit floating point value that specifies a maximum y-coordinate value of the AABB 911, a fifth 32-bit floating point value that specifies a minimum z-coordinate value of the AABB 911, and a sixth 32-bit floating point value that specifies a maximum z-coordinate value of the AABB 911. It will be appreciated that the total memory required for storing six 32-bit values is 24 bytes and may take up a significant portion of the compression block, which may be limited to, e.g., 128 bytes.

However, once the AABB 911 of the block root node has been encoded using high-precision values, the AABBs of the other nodes of the compression block may be encoded with low-precision values. For example, rather than encoding the AABB 912 of child node 922 using six high-precision values, which would require an additional 24 bytes of memory, each of the planes of the AABB 912 may be encoded using low-precision values that specify the location of the planes of the AABB 912 relative to the planes of the AABB of the block root node, in this case AABB 911.

In one embodiment, once the AABB 911 of the block root node has been encoded using high-precision values, each of the planes for the other nodes in the compression block may be specified using a value, m, having n-bits of precision that indicates a relative location of a corresponding plane of the child node somewhere between the minimum plane, $p_1$, and maximum plane, $p_2$, of the block root node, inclusive, on a given axis, given as:

$$d = \frac{m \times (p_2 - p_1)}{2^n - 1} + p_1 \quad \text{(Eq. 1)}$$

where d is a location of the plane on a particular axis of the global coordinate system. For example, if the AABB 911 has a minimum plane for the x-coordinate given by $p_1=1.0$ and a maximum plane for the x-coordinate given by $p_2=56.5$, then an 8-bit value, m, may specify any one of 256 distinct locations on the interval of x=[1.0, 56.5], with the distance between any two adjacent distinct locations being approximately 0.218 wide or 55.5 divided by 255. In other words, a value of 0 in the 8-bit value corresponds to the plane of the child node being equal with the minimum plane of the block root node, a value of 255 in the 8-bit value corresponds to the plane of the child node being equal with the maximum plane of the block root node, and any value in between 0 and 255 corresponds to a different plane between the minimum plane of the block root node and the maximum plane of the block root node.

It will be appreciated that using the lower precision for, e.g., the planes of the child node may prevent the encoded AABB of the child node from being a minimum bounding volume (e.g., because a minimum bounding volume may require precise location of the planes that do not land on one of the distinct locations within the interval). However, as long as the AABB encoded using the lower-precision values always fully encloses the equivalent AABB encoded with high-precision values, then the lower-precision AABB will still yield conservatively correct results for a tree traversal operation. In other words, as long as the low-precision bounding volume always encloses the high-precision bounding volume, then a query data structure that intersects the equivalent high-precision bounding volume will always intersect the low-precision bounding volume, whereas, in some cases, a query data structure that does not intersect the equivalent high-precision bounding volume may sometimes intersect the low-precision bounding volume. Ensuring that the low-precision bounding volume always encompasses the equivalent high-precision bounding volume may be performed by making sure that the encoded values for the minimum planes of the low-precision bounding volume are always less than or equal to the values for the minimum planes of the equivalent high-precision bounding volume, and by making sure that the encoded values for the maximum planes of the low-precision bounding volume are always greater than or equal to the values for the maximum planes of the equivalent high-precision bounding volume.

In another embodiment, three high-precision values and three low-precision values may be used to encode a local coordinate system for the compression block. Then, a single low-precision value may be used to specify each plane of the AABBs for all nodes in the compression block. Instead of encoding the bounding volume of the root node for the compression block using high-precision values, the bounding volume for the root node may be encoded relative to the local coordinate system using low-precision values. In another embodiment, the bounding volume of the block root node may be defined implicitly by an origin and scale of the local coordinate system.

The local coordinate system may be encoded by locating the origin 901 relative to the global coordinate system using three high-precision values and then specifying the extents of the local coordinate system by encoding scale factors for each axis of the local coordinate system using three low-precision values. In one embodiment, the global coordinate system is a Cartesian coordinate system and the origin 901 may be specified using a three element vector including three high-precision values: an x-coordinate value, $o_x$, a y-coordinate value, $o_y$, and a z-coordinate value, $o_z$. For example, the origin of the global coordinate system may be defined as <0.0, 0.0, 0.0> for <$o_x$, $o_y$, $o_z$>. In alternate embodiments, the origin 901 may be specified according to a different coordinate system, such as cylindrical coordinates, spherical coordinates, and the like. As shown in FIG. 9A, the origin 901 of the local coordinate system may correspond to a particular vertex of the AABB 911. Although the lower left front vertex of the AABB 911 is chosen as the origin of the AABB in FIG. 9A, any other point in spatial relation to the AABB 911 (e.g., the center of the volume enclosed by the AABB, the center of a particular face of the AABB, etc.) may be selected as the origin 901 in alternate embodiments.

The scale factor for a particular axis of the local coordinate system may be specified by a low-precision value, e, which is related to the length of a particular axis of the local coordinate system by multiplying a unit vector corresponding to an axis of the global coordinate system by a power of two (i.e., $s=\hat{i} \times 2^e$, where $\hat{i}$ is a unit vector for the global coordinate system, e is the low-precision value, and s is the length of the axis for the local coordinate system). In one embodiment, e is an n-bit, unsigned integer such that the minimum length for an axis of the local coordinate system is equal to the length of the unit vector of the global coordinate system. In another embodiment, e is an n-bit, signed integer such that the minimum length for an axis of the local coordinate system is much smaller than the length of the unit vector of the global coordinate system.

Once the local coordinate system has been specified, each of the bounding volumes within the compression block may be specified relative to the local coordinate system. A single low-precision number may be used to identify a particular location for a given dimension of the local coordinate system. In one embodiment, an n-bit unsigned integer may be used to specify a location for a plane of an AABB relative to the local coordinate system. A location of a plane, p, is then given as:

$$p = \frac{m \times s}{2^n - 1} + o_i \quad \text{(Eq. 2)}$$

$$s = \hat{i} \times 2^e \quad \text{(Eq. 3)}$$

where p is the location of a plane specified by a value, m, having n bits of precision, s is the scale factor given by a low-precision value, e, and $o_i$ is the value of the origin for a given dimension of the local coordinate system. In one embodiment, the scale factor, e, is an 8-bit, signed integer that ranges between −128 and 127, and the value m is an unsigned 8-bit integer that ranges between 0 and 255. In other words, the location of a particular plane, p, is given by a distinct location on a particular axis of the local coordinate system within the interval of [0, s].

As shown above, the scale factor s represents the extents of the local coordinate system in the meaning that values specified in the local coordinate system by the value m for a particular axis may be within the range of [0, s]. In another embodiment, the scale factor s represents a unit vector of the local coordinate system in the meaning that values specified in the local coordinate system by the value m for a particular axis may be within the range of [0, m×s]. As such, Equation 2 becomes:

$$p = m \times s + o_i \quad \text{(Eq. 4)}$$

The practical difference between Equation 2 and Equation 4 is that the scale factor used to represent the size of the local coordinate system is different, which may reduce the complexity of the hardware used to compute the location of a plane.

In yet another embodiment, the encoded value m may indicate a location of a plane in $2^n+1$ distinct locations by exploiting the knowledge of whether the plane is a minimum plane or a maximum plane. In such embodiments, Equation 2 becomes Equations 5 and 6, respectively, for the location of minimum planes and maximum planes:

$$p_{min} = \frac{m \times s}{2^n} + o_i \quad \text{(Eq. 5)}$$

$$p_{max} = \frac{(m+1) \times s}{2^n} + o_i \quad \text{(Eq. 6)}$$

Equations 5 and 6 are similar to Equation 2, except that there is a single additional distinct location that may be encoded by the value m on the interval [0, s]. The additional distinct location is available because a minimum plane cannot occupy the location at s and a maximum plane cannot occupy the location at 0. Thus, a value m for a minimum plane indicates a location of a plane on the interval of $$\left[0, \frac{2^n - 1}{2^n} \times s\right]$$

and a value m for a maximum plane indicates a location of a plane on the interval of $$\left[\frac{1}{2^n} \times s, s\right].$$

It will be appreciated that using relative encoding for AABBs of a compression block reduces the size of the compression block and/or enables more nodes to be stored within a compression block of a limited size. For example, using low-precision, 8-bit integer values for each specified plane instead of high-precision, 32-bit floating point values reduces the number of bits required for encoding an AABB for a child node by 75%; i.e., each plane of the child node may be encoded with a single 8-bit integer rather than a 32-bit floating point value. Similarly, using three high-precision values and three-low precision values to encode a local coordinate system, where the AABB for a block root node is implicit based on the local coordinate system, reduces the number of bits required from 24 bytes to 15 bytes, which results in a smaller footprint even when encoding the block root node of the compression block.

Tree Traversal Operation

Figure 10A:
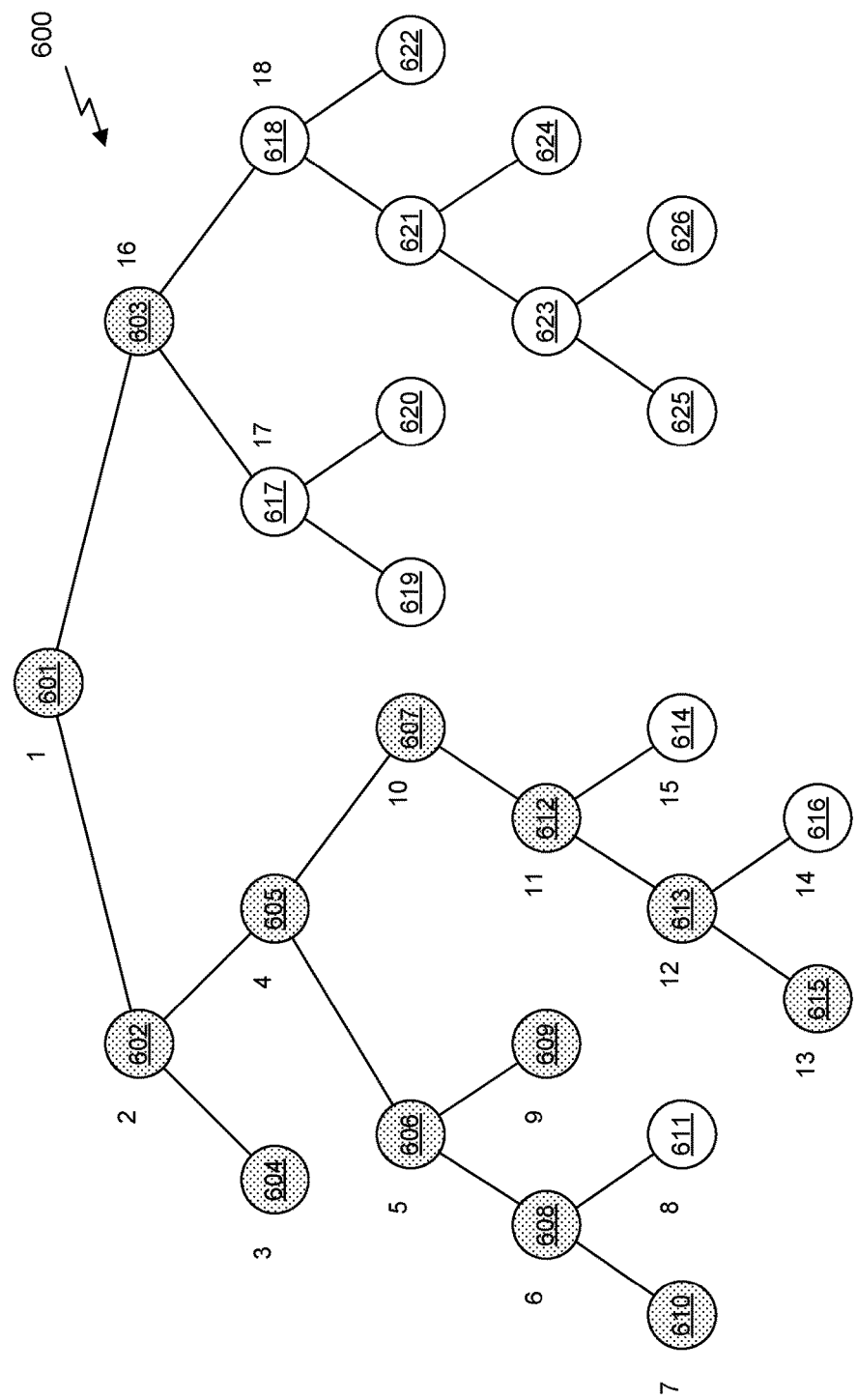
FIG. 10A illustrates a tree traversal operation associated with the tree data structure of FIG. 6A, in accordance with the prior art.

FIG. 10A illustrates a tree traversal operation associated with the tree data structure 600 of FIG. 6A, in accordance with the prior art. Again the tree data structure 600 represents the BVH 650 of FIG. 6B. As shown in FIG. 10A, the tree traversal operation comprises a depth-first traversal of the tree data structure 600 to test for intersection with the ray 690. Each of the nodes that have a bounding volume that intersects the ray 690 is represented as a shaded node. An intersection test performed for a given node determines whether the ray 690 intersects the bounding volume associated with that node. In the case of a 2D bounding rectangle, the ray 690 intersects the bounding rectangle if the ray 690 crosses any of the four edges of the bounding rectangle or is fully enclosed within the bounding rectangle. In the case of a 3D bounding volume, the ray 690 intersects the bounding volume if the ray 690 passes into or through the closed surface of the bounding volume or is fully enclosed within the bounding volume. For example, with an AABB, the ray 690 intersects the AABB if any point on the ray lies inside the volume defined by the six planes that comprise the AABB.

One conventional technique for determining which of the geometric primitives in a 3D model intersect the ray 690 is to perform a depth-first traversal of the BVH 650. A tree traversal operation may be implemented using an algorithm that includes a processing loop for testing a particular node in the tree data structure 600 for intersection with the ray 690 during each iteration of the loop. If the node intersects the ray 690 (i.e., if the ray 690 intersects the bounding volume associated with the node), then the child nodes of that particular node are added to a traversal stack, and then the loop is repeated if the traversal stack is not empty. This type of tree traversal is known in the art as depth-first traversal. As shown in FIG. 10A, the order of nodes tested during a depth first traversal of the tree data structure 600 is shown next to each node. Other techniques may utilize a breadth-first traversal order in which a traversal FIFO is used instead of a traversal stack (i.e., child nodes of intersecting nodes are pushed onto the back of the FIFO instead of the top of the stack and new nodes are popped from the front of the FIFO).

Figure 10B:
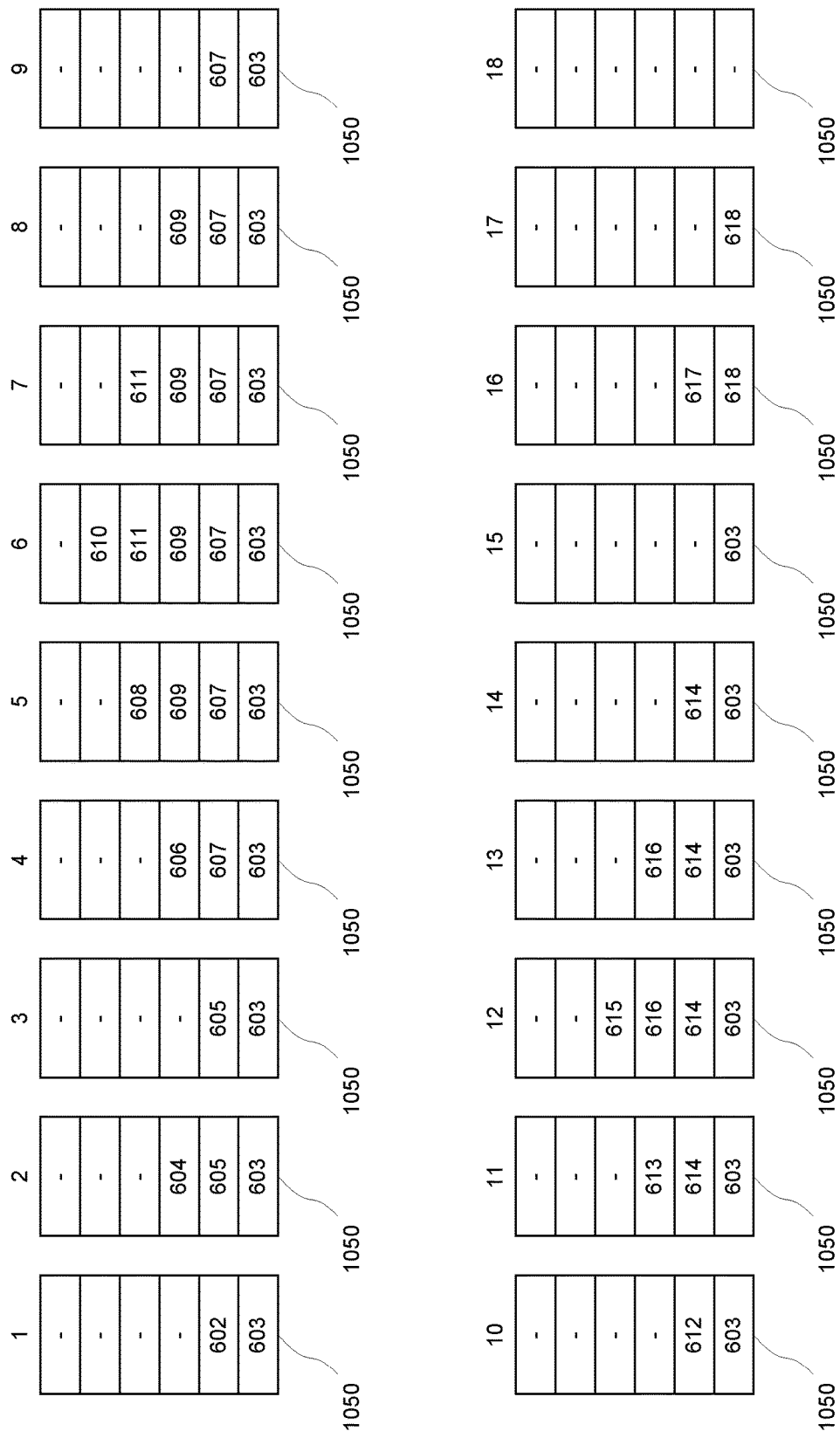
FIG. 10B illustrates the state of a traversal stack data structure during each iteration of the loop in a conventional tree traversal operation, in accordance with the prior art.

FIG. 10B illustrates the state of a traversal stack data structure 1050 during each iteration of the loop in a conventional tree traversal operation, in accordance with the prior art. Again, the tree traversal operation is a conventional depth-first traversal of the tree data structure 600. In order to start the tree traversal operation, the root node 601 of the tree data structure 600 is pushed onto a traversal stack data structure 1050 and a loop is executed.

As shown in FIG. 10B, during the first iteration of the loop, the top element is popped from the traversal stack data structure 1050, which corresponds to node 601. A processor may fetch the data associated with the bounding volume associated with the root node 601 and test that bounding volume for intersection with the ray 690. For node 601, the intersection test returns true and the child nodes of node 601 are added to the traversal stack data structure 1050. In this example, child nodes are traversed left to right, so child nodes are added to the traversal stack data structure 1050 from right to left.

During a second iteration of the loop, the top element is popped from the traversal stack data structure 1050, which corresponds to node 602. The data associated with the bounding volume for node 602 is fetched and tested for intersection with the ray 690. For node 602, the intersection test returns true and the child nodes of node 602 (e.g., nodes 604 and 605) are added to the traversal stack data structure 1050. During a third iteration of the loop, the top element is popped from the traversal stack data structure 1050, which corresponds to node 604, which is a leaf node and doesn't have any child nodes. The data associated with the bounding volume for node 604 is fetched and tested for intersection with the ray 690. For node 604, the intersection test returns true, but since node 604 is a leaf node, the geometric primitives associated with node 604 are added to a result queue. It will be appreciated that even though the bounding volume associated with node 604 was intersected by the ray 690, the geometric primitives enclosed by that bounding volume may not be intersected by the ray 690. Thus, the geometric primitives should be separately tested for intersection by the ray 690. Intersection of the geometric primitives with the ray 690 may be performed outside the loop for all geometric primitives selected during the tree traversal operation. Alternately, primitives added to the result queue may be intersected with the ray 690 during the tree traversal operation, either in parallel with or in between tree traversal steps.

During the fourth iteration of the loop, the top element is popped from the traversal stack data structure 1050, which corresponds to node 605. The data associated with the bounding volume for node 605 is fetched and tested for intersection with the ray 690. For node 605, the intersection test returns true and the child nodes of node 605 (e.g., nodes 606 and 607) are added to the traversal stack data structure 1050. The tree traversal continues in this fashion until the fifteenth iteration of the loop, where the top element is popped from the traversal stack data structure 1050, which corresponds to node 614. The data associated with the bounding volume for node 614 is fetched and tested for intersection with the ray 690. For node 614, the intersection test returns false and all descendants of node 602 have now been tested. However, the traversal stack data structure 1050 is not empty because node 603, which was added during the first iteration of the loop, is still in the traversal stack data structure 1050. Thus, during the sixteenth iteration of the loop, the top element is popped from the traversal stack data structure 1050, which corresponds to node 603. The data associated with the bounding volume for node 603 is fetched and tested for intersection with the ray 690. For node 603, the intersection test returns true and the child nodes of node 603 (e.g., nodes 617 and 618) are added to the traversal stack data structure 1050. During the seventeenth iteration of the loop, the top element is popped from the traversal stack data structure 1050, which corresponds to node 617. The data associated with the bounding volume for node 617 is fetched and tested for intersection with the ray 690. For node 617, the intersection test returns false and no nodes are added to the traversal stack data structure 1050. During the eighteenth iteration of the loop, the top element is popped from the traversal stack data structure 1050, which corresponds to node 618. The data associated with the bounding volume for node 618 is fetched and tested for intersection with the ray 690. For node 618, the intersection test returns false and no nodes are added to the traversal stack data structure 1050. At this point, the traversal stack data structure 1050 is empty and the tree traversal operation is complete. The result of the tree traversal operation has determined that the geometric primitives associated with nodes 604, 609, 610, and 615 are potentially intersected by the ray 690. The geometric primitives referenced by these four nodes may then be tested for intersection with the ray 690.

Again the use of the tree data structure 600 to cull the amount of geometric primitives to be tested against the ray may save a tremendous amount of processing when compared to testing each one of the geometric primitives included in the model against the ray individually. However, there may still be inefficiencies with this depth-first traversal of the tree-data structure 600 that are based on the implementation of the hardware through which the tree traversal operation is performed. For example, in many hardware architectures, when the data for a particular node, such as the root node 601, is fetched from memory, a constant amount of data will be returned. Many times the amount of data returned will be equal to the size of a cache line in a cache of the processor. This cache line may not only contain the data for node 601, but also for nodes 602, 603, and potentially other nodes such as the children of nodes 602 and 603. So, the cache line fetched for the first iteration of the loop may also include the data required for the second iteration of the loop. However, as the tree data structure 600 is traversed in a depth-first manner, this first cache line may be evicted and replaced with data for nodes further down the tree, such as data for nodes 608, 610, and 611, which are stored in a different cache line. As the tree is traversed and the algorithm reaches the sixteenth iteration of the loop, the algorithm needs to fetch data associated with node 603, which had already been fetched previously. However, if the data was evicted from the cache to make room for other data in the cache during the depth-first traversal of the tree data structure 600, the cache line containing the data for node 603 may need to be fetched again. As the tree data structure 600 gets much larger, and especially if the type of tree is a four-ary tree or an octree, it becomes clear that latency caused by redundant fetches of the same cache line multiple times can severely reduce the efficiency of the depth-first traversal algorithm. Thus, a new technique optimized for certain hardware architectures may be required to improve efficiency of tree traversal operations.

Figure 11A:
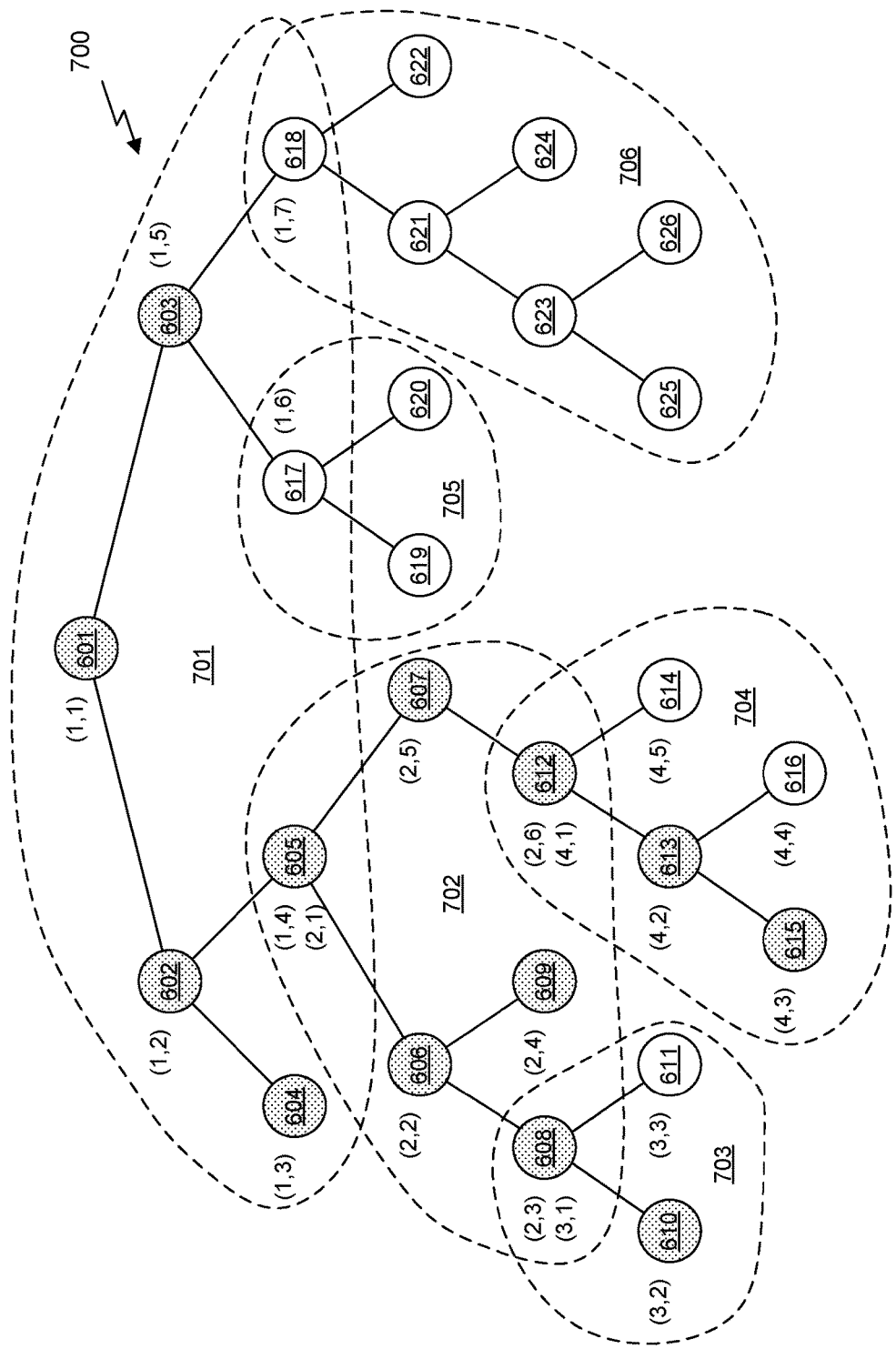
FIG. 11A illustrates a tree traversal operation that utilizes the compression block encoding of the tree data structure of FIG. 7A, in accordance with one embodiment.

FIG. 11A illustrates a tree traversal operation that utilizes the compression block encoding of the tree data structure 700 of FIG. 7A, in accordance with one embodiment. Again the tree data structure 700 represents the BVH 650 of FIG. 6B, except that sets of nodes of the tree data structure 700 have been grouped according to compression blocks. The tree traversal operation comprises a compression block aware, depth-first traversal of the tree data structure 700 to test for intersection with the ray 690. Unlike a pure depth-first traversal of tree data structure 600, the tree traversal operation based on compression blocks tests each node included in a particular compression block before moving onto any other nodes that need to be tested in the tree data structure 700.

The algorithm implements a nested loop structure in order to execute the tree traversal operation. An outer loop is repeated a number of times with one iteration performed per traversed compression block of the tree data structure 700. An inner loop is repeated a number of times during each iteration of the outer loop in order to traverse the nodes in a compression block that is currently being traversed. The structure of the tree traversal operation is specifically configured to exploit the locality of data associated with the compression blocks, which enables increased processing efficiency to be realized in architectures that may include long memory latency. In one embodiment, the compression block aware, depth-first traversal of the tree data structure 700 may be performed by the PPU 200. More specifically, a TTU 500 may be configured to perform the compression block aware, depth-first traversal of the tree data structure 700.

FIGS. 11B-11E illustrate the state of a local stack data structure 1150 after each iteration of the inner loop of the depth-first, compression block aware tree traversal operation, in accordance with one embodiment. Each Figure illustrates the state of the local stack data structure 1150 during processing of one of the compression blocks.

FIG. 11F illustrates the state of the traversal stack data structure 1050 after each iteration of the outer loop during the depth-first, compression block aware tree traversal operation, in accordance with one embodiment. As shown in FIG. 11F, there are four iterations of the outer loop, corresponding to the root nodes for the traversed compression blocks during the tree traversal operation.

Figure 11B:
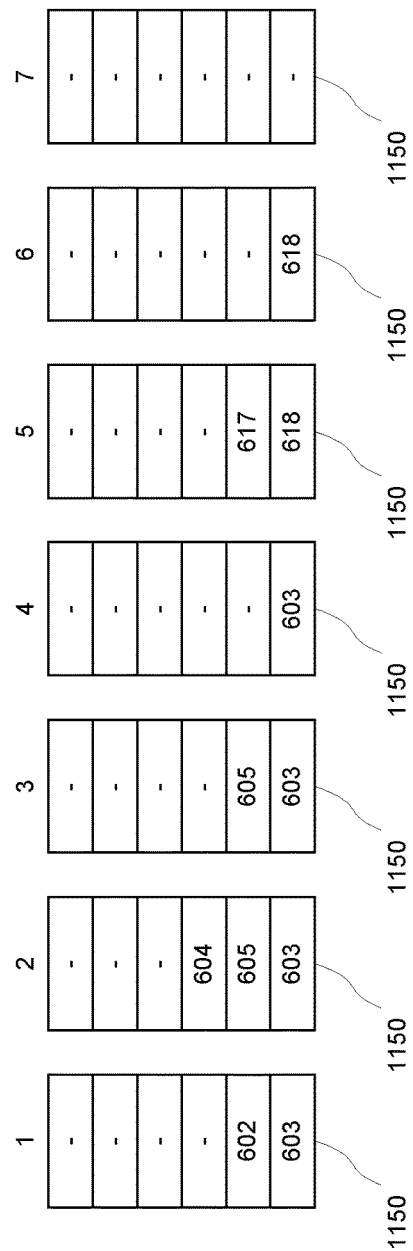

Before either loop is entered, the root node 601 of the tree data structure 700 may be added to a traversal stack data structure 1050, which corresponds to the outer loop. As shown in FIG. 11B, during a first iteration of the outer loop, the top element is popped from the traversal stack data structure 1050. The top element popped from the traversal stack data structure 1050 will always correspond to a root node of a compression block. For example, node 601 is the root node of the first compression block 701. The compression block associated with the node popped from the stack data structure 1050 becomes the currently traversed compression block and all data associated with the nodes of the compression block may be fetched into a local memory. The block root node for the compression block is then pushed onto a local stack data structure 1150 and the inner loop is executed for the compression block associated with the node.

The state of the local stack data structure 1150 after each iteration of the inner loop while processing the first compression block 701 is shown in FIG. 11B. During a first iteration of the inner loop for the first compression block 701, the top element is popped from the local stack data structure 1150, which corresponds to node 601. The data associated with the bounding volume for node 601 is fetched and tested for intersection with the ray 690. For node 601, the intersection test returns true and the child nodes of node 601 (e.g., nodes 602 and 603) are added to a local stack data structure 1150. The local stack data structure 1150 is similar to the traversal stack data structure 1050, but limited to the scope of the current compression block and not the entire tree data structure 700.

In one embodiment, the block root node of a compression block may not be tested for intersection with the ray 690. It is assumed that all rays associated with a tree traversal operation will intersect the bounding volume associated with the root node of the tree data structure 700, because the bounding volume may enclose the entire model and/or any rays that do not intersect the bounding volume of the root node may be easily clipped and no tree traversal operation is initiated. Furthermore, it may be assumed that any block root node for the compression block being traversed intersects the ray, because the bounding volume of the block root node would have been tested for intersection with the ray when a transition node associated with the block root node was tested during traversal of a "parent" compression block. Thus, the only way that a block root node is traversed during the tree traversal operation is if the block root node is popped from the stack data structure 1050 and the inner loop is entered to traverse the compression block associated with the block root node. In such embodiments, the intersection test of the block root node may be skipped and the child nodes of the block root node may be pushed onto the local stack data structure 1150.

During a second iteration of the inner loop for the first compression block 701, the top element is popped from the local stack data structure 1150, which corresponds to node 602. The data associated with the bounding volume for node 602 is fetched and tested for intersection with the ray 690. For node 602, the intersection test returns true and the child nodes of node 602 (e.g., nodes 604 and 605) are added to the local stack data structure 1150. During a third iteration of the inner loop for the first compression block 701, the top element is popped from the local stack data structure 1150, which corresponds to node 604. Node 604 is a leaf node and does not have any child nodes. The data associated with the bounding volume for node 604 is fetched and tested for intersection with the ray 690. For node 604, the intersection test returns true, but since node 604 is a leaf node, the geometric primitives associated with node 604 are added to a result queue. It will be appreciated that even though the bounding volume associated with node 604 was intersected by the ray 690, the geometric primitives enclosed by that bounding volume may not be intersected by the ray 690. Thus, the geometric primitives should be separately tested for intersection by the ray 690. Intersection of the geometric primitives with the ray 690 may be performed outside of both the inner loop and the outer loop for all geometric primitives selected during the tree traversal operation.

During a fourth iteration of the inner loop for the first compression block 701, the top element is popped from the local stack data structure 1150, which corresponds to node 605. The data associated with the bounding volume for node 605 is fetched and tested for intersection with the ray 690. For node 605, the intersection test returns true. Node 605 is a transition node that is linked externally to the second compression block 702. Consequently, a pointer to the block root node of the second compression block 702, included in node 605 in the first compression block 701, is stored in a list data structure to be added to the traversal stack data structure 1050 when the inner loop has finished processing the first compression block 701. In other embodiments, the transition nodes may not include data associated with a bounding volume for the node. In such other embodiments, the pointer to the block root node of the second compression block 702 is stored in a list data structure to be added to the traversal stack data structure 1050 when the inner loop has finished processing the first compression block 701 without testing the node for intersection with the ray. In other words, the compression block pointed to by the transition node may be processed during another iteration of the outer loop whether the bounding volume associated with the block root node of the compression block is intersected by the ray. It will be appreciated that such embodiments may decrease the efficiency of the algorithm by requiring data for certain compression blocks to be fetched from memory even if the root node of the compression block is not intersected by the ray. However, this inefficiency may be balanced by the fact that the transition nodes in a "parent" compression block would not need to store bounding volume information and, therefore, more nodes may fit within a compression block of a given size when the compression block includes one or more transition nodes.

During a fifth iteration of the inner loop for the first compression block 701, the top element is popped from the local stack data structure 1150, which corresponds to node 603. The data associated with the bounding volume for node 603 is fetched and tested for intersection with the ray 690. For node 603, the intersection test returns true and the child nodes of node 603 (e.g., nodes 617 and 618) are added to the local stack data structure 1150. During a sixth iteration of the inner loop for the first compression block 701, the top element is popped from the local stack data structure 1150, which corresponds to node 617. The data associated with the bounding volume for node 617 is fetched and tested for intersection with the ray 690. For node 617, the intersection test returns false. It will be appreciated that, even though node 617 is a transition node, the false result of the intersection test prevents the need to traverse the fifth compression block 705 and, therefore, nothing needs to be added to the list data structure to be added to the traversal stack data structure 1050 when the inner loop has finished processing the first compression block 701. During a seventh iteration of the inner loop for the first compression block 701, the top element is popped from the local stack data structure 1150, which corresponds to node 618. The data associated with the bounding volume for node 618 is fetched and tested for intersection with the ray 690. For node 618, the intersection test returns false. Again, even though node 618 is a transition node, the false result of the intersection test prevents the need to traverse the sixth compression block 706 and, therefore, nothing needs to be added to the list data structure to be added to the traversal stack data structure 1050 when the inner loop has finished processing the first compression block 701. After the seventh iteration of the inner loop for the first compression block 701, the local stack data structure 1150 is empty and the inner loop has finished processing the first compression block 701. The intersected transition nodes included in the list data structure, namely node 605, are added to the traversal stack data structure 1050 as a subsequent step during a particular iteration of the outer loop after the inner loop has finished processing the current compression block being traversed.

During a second iteration of the outer loop, the top element is popped from the traversal stack data structure 1050, which corresponds to node 605. The node is pushed onto the local stack data structure 1150 and the inner loop is executed for the compression block associated with the node. Node 605 is a root node of the second compression block 702 and, therefore, node 605 is pushed onto the local stack data structure 1150 and the inner loop is then entered for the second compression block 702.

Figure 11C:
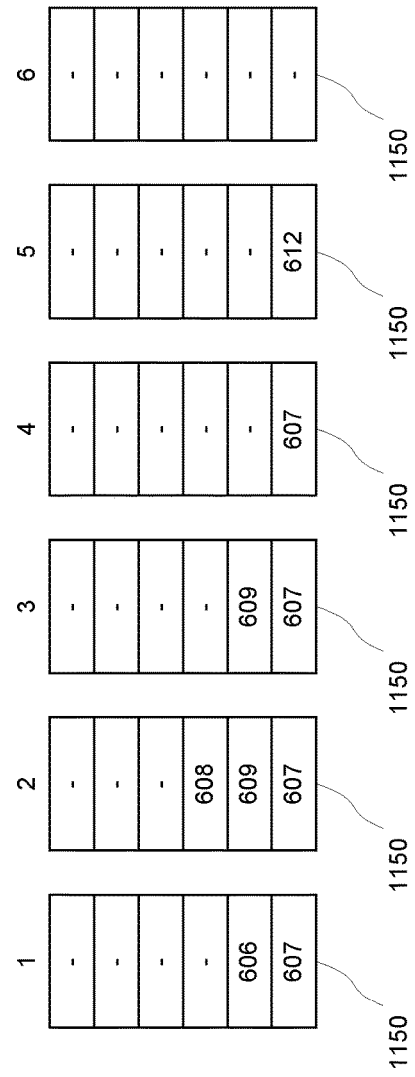

The state of the local stack data structure 1150 after each iteration of the inner loop while processing the second compression block 702 is shown in FIG. 11C. During a first iteration of the inner loop for the second compression block 702, the top element is popped from the local stack data structure 1150, which corresponds to node 605. The data associated with the bounding volume for node 605 is fetched and tested for intersection with the ray 690. For node 605, the intersection test returns true and the child nodes of node 605 (e.g., nodes 606 and 607) are added to the local stack data structure 1150. During a second iteration of the inner loop for the second compression block 702, the top element is popped from the local stack data structure 1150, which corresponds to node 606. The data associated with the bounding volume for node 606 is fetched and tested for intersection with the ray 690. For node 606, the intersection test returns true and the child nodes of node 606 (e.g., nodes 608 and 609) are added to the local stack data structure 1150. During a third iteration of the inner loop for the second compression block 702, the top element is popped from the local stack data structure 1150, which corresponds to node 608. The data associated with the bounding volume for node 608 is fetched and tested for intersection with the ray 690. For node 608, the intersection test returns true. Node 608 is a transition node that is linked externally to the third compression block 703. Consequently, a pointer to the block root node of the third compression block 703, included in node 608 in the second compression block 702, is stored in a list data structure to be added to the traversal stack data structure 1050 when the inner loop has finished processing the second compression block 702.

During a fourth iteration of the inner loop for the second compression block 702, the top element is popped from the local stack data structure 1150, which corresponds to node 609. Node 609 is a leaf node. The data associated with the bounding volume for node 609 is fetched and tested for intersection with the ray 690. For node 609, the intersection test returns true and any geometric primitives associated with node 609 are added to a result queue. During a fifth iteration of the inner loop for the second compression block 702, the top element is popped from the local stack data structure 1150, which corresponds to node 607. The data associated with the bounding volume for node 607 is fetched and tested for intersection with the ray 690. For node 607, the intersection test returns true and the child nodes of node 607 (e.g., node 612) are added to the local stack data structure 1150. During a sixth iteration of the inner loop for the second compression block 702, the top element is popped from the local stack data structure 1150, which corresponds to node 612. The data associated with the bounding volume for node 612 is fetched and tested for intersection with the ray 690. For node 612, the intersection test returns true. Node 612 is a transition node that is linked externally to the fourth compression block 704. Consequently, a pointer to node 612 in the fourth compression block 704 is stored in the list data structure to be added to the traversal stack data structure 1050 when the inner loop has finished processing the second compression block 702. After the sixth iteration of the inner loop for the second compression block 702, the local stack data structure 1150 is empty and the inner loop has finished processing the second compression block 702. The intersected transition nodes, namely nodes 608 and 612 are then added to the traversal stack data structure 1050.

Traversal of the outer loop and inner loop continues in this manner until the traversal stack data structure 1050 is empty at the end of an iteration of the outer loop, indicating that the traversal of the tree data structure 700 is complete. During the third iteration of the outer loop, the third compression block 703 is processed by the inner loop. As shown in FIG. 11D, there are three iterations of the inner loop for the third compression block 703, processing nodes 608, 610, and 611. During the fourth iteration of the outer loop, the fourth compression block 704 is processed by the inner loop. As shown in FIG. 11E, there are five iterations of the inner loop for the fourth compression block 704, processing nodes 612, 613, 615, 616, and 614. After the fourth iteration of the outer loop, the traversal stack data structure 1050 is empty and the tree traversal operation is complete.

Tables 1 and 2 show pseudo code for the outer loop and inner loop of the depth-first, compression block aware tree traversal operation. Table 1 shows pseudo code for the outer loop.

TABLE 1

```
outerTraversal (Ray ray, Node* bvhRoot)
{
    Stack traversalStack;
    traversalStack.push(bvhRoot);
    while(!traversalStack.empty( ))
    {
        Node* node = traversalStack.pop( );
        List intersectedExternalNodes = innerTraversal(ray, node);
        traversalStack.push(intersectExternalNodes);
    }
}
```

As the pseudo code for the outer loop makes clear, the root node for the tree data structure is added to a stack data structure before entering a loop (i.e., the outer loop). Then, the top element (i.e., node) is popped from the stack data structure and the inner loop is entered. Table 2 shows pseudo code for the inner loop.

TABLE 2

```
innerTraversal (Ray ray, Node* blockRoot)
{
    List intersectedExternalNodes;
    Stack localStack;
    localStack.push(blockRoot);
    while(!localStack.empty( ))
    {
        Node* node = localStack.pop( );
        if (ray.intersects(node))
        {
            if (node.isLeaf) {
                addToResultQueue(node);
            } else if (node.isTransitionNode) {
                intersectedExternalNodes.add(node.externalNodePointer);
            } else {
                List childNodes = node.childNodes;
                sort(childNodes);
```

TABLE 2-continued

```
                localStack.push(childNodes);
            }
        }
    }
    return intersectedExternalNodes
}
```

As the pseudo code for the inner loop makes clear, a list data structure and a stack data structure are declared and the root node of the compression block is pushed onto the stack data structure before entering a loop (i.e., the inner loop). Then, the top element (i.e., node) is popped from the stack data structure and tested for intersection against the ray. If the ray does not intersect the node, then the inner loop is repeated as long as the stack data structure is not empty. However, if the ray intersects the node, then the type of node is determined. If the node is a leaf node, then the node (or a pointer to one or more graphics primitives associated with the node) is added to the result queue. If the node is a transition node, then the pointer to the external compression block is added to the list data structure. Finally, if the node is an internal node, then the child nodes of the node are added to the stack data structure. The inner loop is repeated as long as the stack data structure is not empty. Once the inner loop is complete, the list of intersected external nodes is returned to the outer loop to be added to the stack data structure associated with the outer loop.

It will be appreciated that the structure of the pseudo code shown above may vary slightly in different implementations of a depth-first, compression block aware tree traversal operation. For example, as shown in Table 2, the ray is tested for intersection with the given node during each iteration of the inner loop and, if the ray intersects the node, then any child nodes of the node are added to the stack data structure without first checking the intersection of the ray with the child nodes (i.e., the intersection of the ray with the child nodes will be performed during a subsequent iteration of the inner loop). However, in a different implementation of the depth-first, compression block aware tree traversal operation, before entering the inner loop, the intersection of the root node for the compression block may be tested and the inner loop may only be entered if the ray intersects the root node. Then, during each iteration of the inner loop, the intersection of the ray with the current node is already known to be true, and only intersected child nodes are added to the stack data structure associated with the inner loop. In other words, only nodes that have been shown to be intersected with the ray are ever pushed to the stack data structure associated with the inner loop. In contrast, the pseudo code in Table 2 allows for child nodes to be pushed to the stack data structure associated with the inner loop before checking for intersection with the ray. However, such differences in the particular implementation of the depth-first, compression block aware tree traversal operation do not materially change the efficiency of the operation and only relate to when certain processing is performed.

In another embodiment, the tree traversal operation may be modified to perform a breadth-first, compression block aware tree traversal operation on the tree data structure 700. Each node in a particular compression block may be tested in a breadth-first order before other nodes of the tree data structure are traversed. For example, during a first iteration of the outer loop, the first compression block 701 would be processed in a breadth-first manner, during a second iteration of the outer loop, the second compression block 702 would be processed in a breadth-first manner, and so forth. The outer loop may also be modified to process intersected compression blocks in a breadth-first manner. In one embodiment, the outer loop may process intersected compression blocks in a depth-first manner while the inner loop may process nodes of a particular compression block in a breadth-first manner, or vice versa.

Figure 12:
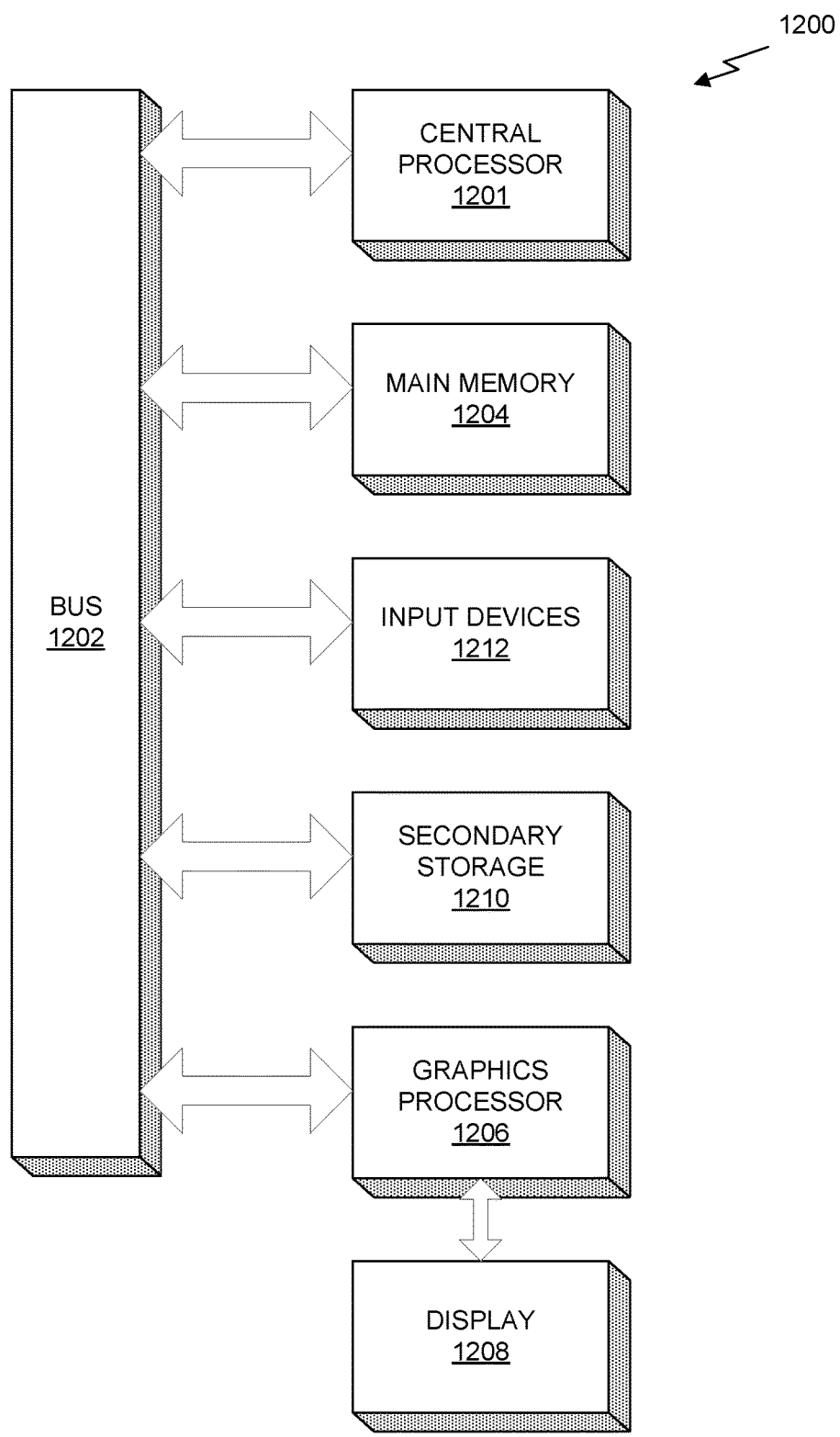
FIG. 12 illustrates an exemplary system in which the various architecture and/or functionality of the various previous embodiments may be implemented.

FIG. 12 illustrates an exemplary system 1200 in which the various architecture and/or functionality of the various previous embodiments may be implemented. As shown, a system 1200 is provided including at least one central processor 1201 that is connected to a communication bus 1202. The communication bus 1202 may be implemented using any suitable protocol, such as PCI (Peripheral Component Interconnect), PCI-Express, AGP (Accelerated Graphics Port), HyperTransport, or any other bus or point-to-point communication protocol(s). The system 1200 also includes a main memory 1204. Control logic (software) and data are stored in the main memory 1204 which may take the form of random access memory (RAM).

The system 1200 also includes input devices 1212, a graphics processor 1206, and a display 1208, i.e. a conventional CRT (cathode ray tube), LCD (liquid crystal display), LED (light emitting diode), plasma display or the like. User input may be received from the input devices 1212, e.g., keyboard, mouse, touchpad, microphone, and the like. In one embodiment, the graphics processor 1206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1200 may also include a secondary storage 1210. The secondary storage 1210 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1204 and/or the secondary storage 1210. Such computer programs, when executed, enable the system 1200 to perform various functions. The memory 1204, the storage 1210, and/or any other storage are possible examples of computer-readable media.

In one embodiment, the architecture and/or functionality of the various previous figures may be implemented in the context of the central processor 1201, the graphics processor 1206, an integrated circuit (not shown) that is capable of at least a portion of the capabilities of both the central processor 1201 and the graphics processor 1206, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1200 may take the form of a desktop computer, laptop computer, server, workstation, game consoles, embedded system, and/or any other type of logic. Still yet, the system 1200 may take the form of various other devices including, but not limited to a personal digital assistant (PDA) device, a mobile phone device, a television, etc.

Further, while not shown, the system 1200 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a tree data structure, wherein the tree data structure is encoded as a plurality of compression block data structures stored in a memory, including a first compression block data structure associated with a first local coordinate system having an origin that is specified relative to a global coordinate system, wherein a scale factor for each axis of the first local coordinate system is represented by a corresponding n-bit integer having a value e, and wherein the extents of the first local coordinate system may be calculated by multiplying unit vectors corresponding to each axis of the global coordinate system by a power of two, where the value e is the exponent of the power of two; and
processing, via a tree traversal operation algorithm executed by one or more processors, one or more nodes of the tree data structure by intersecting the one or more nodes of the tree data structure with a query data structure.

2. The method of claim 1, wherein the tree data structure represents a bounding volume hierarchy (BVH).

3. The method of claim 1, wherein the first compression block data structure comprises three high-precision values that specify the origin of the first local coordinate system relative to the global coordinate system and three low-precision values that specify the scale factor for each axis of the first local coordinate system.

4. The method of claim 3, wherein the three high-precision values are encoded using floating point values and the three low-precision values are encoded using integers.

5. The method of claim 4, wherein each high-precision value of the three high-precision values is encoded as a 32-bit floating point value, and wherein each low-precision value of the three low-precision values is encoded as an 8-bit integer.

6. The method of claim 1, wherein one or more bounding volumes encoded within the first compression block data structure are specified relative to the local coordinate system.

7. The system of claim 6, wherein each high-precision value of the three high-precision values is encoded as a 32-bit floating point value, and wherein each low-precision value of the three low-precision values is encoded as an 8-bit integer.

8. A method of claim 1, comprising:
receiving a tree data structure, wherein the tree data structure is encoded as a plurality of compression block data structures stored in a memory, including a compression block data structure associated with a local coordinate system, wherein
the local coordinate system encoded in a corresponding compression block data structure is specified relative to a global coordinate system,
one or more bounding volumes encoded within the compression block data structure are specified relative to the local coordinate system,
each bounding volume in the one or more bounding volumes encoded within the compression block data structure is an axis-aligned bounding box (AABBs) specified as six planes; and
a location of each plane is specified by an n-bit integer having a value m that indicates a distinct location on a particular axis of the local coordinate system based on a product of the value m and a scale factor s; and
processing, via a tree traversal operation algorithm executed by one or more processors, one or more nodes of the tree data structure by intersecting the one or more nodes of the tree data structure with a query data structure.

9. The method of claim 8, wherein the value m is encoded as an unsigned integer, and the scale factor s is encoded as a signed integer that specifies a value e.

10. The method of claim 9, wherein the unsigned integer that encodes the value m is 8-bits having a value between 0 and 255, and the signed integer that encodes the scale factors is 8-bits having a value between −128 and 127.

11. A non-transitory computer-readable storage medium storing instructions that, when executed by one or more processors, cause the one or more processors to perform steps comprising:
receiving a tree data structure, wherein the tree data structure is encoded as a plurality of compression block data structures stored in a memory, including a first compression block data structure associated with a first local coordinate system having an origin relative to a global coordinate system, wherein a scale factor for each axis of the first local coordinate system is represented by a corresponding n-bit integer having a value e, and wherein the extents of the first local coordinate system may be calculated by multiplying unit vectors corresponding to each axis of the global coordinate system by a power of two, where the value e is the exponent of the power of two; and
processing, via a tree traversal operation algorithm executed by one or more processors, one or more nodes of the tree data structure by intersecting the one or more nodes of the tree data structure with a query data structure.

12. The computer-readable storage medium of claim 11, wherein the first compression block data structure comprises three high-precision values that specify the origin of the first local coordinate system relative to the global coordinate system and three low-precision values that specify the scale factor for each axis of the first local coordinate system.

13. The computer-readable storage medium of claim 11, wherein one or more bounding volumes encoded within the compression block data structure are specified relative to the first local coordinate system.

14. The computer-readable storage medium of claim 11, wherein the three high-precision values are encoded using floating point values and the three low-precision values are encoded using integers.

15. The computer-readable storage medium of claim 14, wherein each high-precision value of the three high-precision values is encoded as a 32-bit floating point value, and wherein each low-precision value of the three low-precision values is encoded as an 8-bit integer.

16. A system, comprising:
a memory storing instructions for a tree traversal operation algorithm; and
one or more processors configured to execute the tree traversal operation algorithm by:
receiving a tree data structure, wherein the tree data structure is encoded as a plurality of compression block data structures stored in the memory, including a first compression block data structure associated with a first local coordinate system having an origin that is specified relative to a global coordinate system, wherein a scale factor for each axis of the first local coordinate system is represented by a corresponding n-bit integer having a value e, and wherein the extents of the first local coordinate system may be calculated by multiplying unit vectors corresponding to each axis of the global coordinate system by a power of two, where the value e is the exponent of the power of two; and
processing one or more nodes of the tree data structure by intersecting the one or more nodes of the tree data structure with a query data structure.

17. The system of claim 16, wherein the tree data structure represents a bounding volume hierarchy (BVH).

18. The system of claim 16, wherein the first local coordinate system is encoded using three high-precision values to specify the origin of the first local coordinate system relative to the global coordinate system and three low-precision values to specify the scale factor for each axis of the first local coordinate system.

19. The system of claim 18, wherein the three high-precision values are encoded using floating point values and the three low-precision values are encoded using integers.

20. The system of claim 16, wherein one or more bounding volumes encoded within the first compression block data structure are specified relative to the local coordinate system.

* * * * *

UNITED STATES PATENT AND TRADEMARK OFFICE
CERTIFICATE OF CORRECTION

PATENT NO. : 10,032,289 B2
APPLICATION NO. : 15/377959
DATED : July 24, 2018
INVENTOR(S) : Samuli Matias Laine et al.

Page 1 of 1

It is certified that error appears in the above-identified patent and that said Letters Patent is hereby corrected as shown below:

In the Claims

Column 45, Line 31, Claim 10 replace "scale factors" with --scale factor *s*--.

Signed and Sealed this
Eighteenth Day of February, 2020

Andrei Iancu
*Director of the United States Patent and Trademark Office*